United States Patent
Bourke et al.

(10) Patent No.: US 11,548,013 B2
(45) Date of Patent: *Jan. 10, 2023

(54) FLOTATION ARRANGEMENT, ITS USE, A PLANT AND A METHOD

(71) Applicant: OUTOTEC (FINLAND) OY, Espoo (FI)

(72) Inventors: Peter Bourke, Maida Vale Perth (AU); Antti Rinne, Espoo (FI)

(73) Assignee: METSO OUTOTEC FINLAND OY, Tampere (FI)

( * ) Notice: Subject to any disclaimer, the term of this patent is extended or adjusted under 35 U.S.C. 154(b) by 395 days.

This patent is subject to a terminal disclaimer.

(21) Appl. No.: 16/484,170

(22) PCT Filed: Feb. 15, 2017

(86) PCT No.: PCT/FI2017/050094
§ 371 (c)(1),
(2) Date: Aug. 7, 2019

(87) PCT Pub. No.: WO2018/150076
PCT Pub. Date: Aug. 23, 2018

(65) Prior Publication Data
US 2020/0023380 A1 Jan. 23, 2020

(51) Int. Cl.
*B03D 1/02* (2006.01)
*B03D 1/14* (2006.01)
(Continued)

(52) U.S. Cl.
CPC .......... *B03D 1/1406* (2013.01); *B03D 1/087* (2013.01); *B03D 1/24* (2013.01); *C22B 1/00* (2013.01);
(Continued)

(58) Field of Classification Search
CPC ........ B03D 1/24; B03D 1/087; B03D 1/1406; B03D 2203/025; B03D 2203/04; B03D 2203/02; C22B 1/00
(Continued)

(56) References Cited

U.S. PATENT DOCUMENTS 3,307,790 A * 3/1967 Cohn .................. B03D 1/1456
241/5
4,460,459 A 7/1984 Shaw et al.
(Continued)

FOREIGN PATENT DOCUMENTS

CN 1820853 A 8/2006
CN 201143456 Y 11/2008
(Continued)

OTHER PUBLICATIONS

Chilean Search Report issued by the Chilean Patent Office in relation to Chilean Application No. 201902227 dated May 15, 2020 (3 pages).
Extended European Search Report issued by the European Patent Office in relation to European Application No. 17868514.5 dated Oct. 27, 2020 (9 pages).
(Continued)

*Primary Examiner* — Peter Keyworth
(74) *Attorney, Agent, or Firm* — Robert P. Michal, Esq.; Carter, DeLuca & Farrell LLP

(57) ABSTRACT

A flotation arrangement for treating mineral ore particles suspended in slurry. The arrangement includes a primary line including at least two primary flotation cells, a first secondary line, and a second secondary line downstream of the first secondary line. In the arrangement, underflow from a secondary line is arranged to flow to the last of the at least one primary flotation cells from which the primary overflow was received, or to a primary flotation cell downstream of the last of the at least one primary flotation cells from which
(Continued)

the primary overflow was received. The disclosure further relates a use of a flotation arrangement, to a flotation plant and to a flotation method.

80 Claims, 15 Drawing Sheets

(51) Int. Cl.
 *B03D 1/08* (2006.01)
 *B03D 1/24* (2006.01)
 *C22B 1/00* (2006.01)

(52) U.S. Cl.
 CPC .... *B03D 2203/02* (2013.01); *B03D 2203/025* (2013.01); *B03D 2203/04* (2013.01)

(58) Field of Classification Search
 USPC ................................................ 209/164–170
 See application file for complete search history.

(56) References Cited

U.S. PATENT DOCUMENTS

| | | | |
|---|---|---|---|
| 4,960,059 A | 10/1990 | Berkau et al. | |
| 5,285,972 A | 2/1994 | Notebaart et al. | |
| 5,925,862 A | 7/1999 | Morrisey, IV et al. | |
| 5,951,875 A | 9/1999 | Kanel et al. | |
| 9,028,782 B2 | 5/2015 | Senior et al. | |
| 9,346,062 B2 * | 5/2016 | Gorain | B03D 1/002 |
| 9,475,067 B2 * | 10/2016 | Bai | B03D 1/02 |
| 10,913,075 B2 * | 2/2021 | Rinne | B03D 1/087 |
| 10,960,408 B2 * | 3/2021 | Rinne | B03D 1/1406 |
| 2015/0136664 A1 * | 5/2015 | Harding | B03D 1/14 209/154 |
| 2016/0158767 A1 | 6/2016 | Bai et al. | |

FOREIGN PATENT DOCUMENTS

| | | | |
|---|---|---|---|
| CN | 201823604 U | | 5/2011 |
| CN | 102366731 A | * | 3/2012 |
| CN | 102397819 A | | 4/2012 |
| CN | 102974466 A | * | 3/2013 |
| CN | 103386356 A | | 11/2013 |
| CN | 203678523 U | | 7/2014 |
| CN | 104226461 A | | 12/2014 |
| CN | 104841567 A | | 8/2015 |
| CN | 105689146 A | | 6/2016 |
| CN | 106170343 A | | 11/2016 |
| CN | 209663508 U | | 11/2019 |
| CN | 209829277 U | | 12/2019 |
| EP | 0476354 A2 | | 3/1992 |
| FI | 11851 U1 | | 11/2017 |
| GB | 538996 A | | 8/1941 |
| WO | 9924169 A1 | | 5/1999 |
| WO | 0015345 A1 | | 3/2000 |

OTHER PUBLICATIONS

Office Action issued by the China National Intellectual Property Administration in relation to Chinese Application No. 201780086065.4 dated Nov. 26, 2020 (13 pages) along with English language translation (2 pages).

Flotación de Sulfuros de Cobre (https://www.911metallurgist.com/metalurgia/flotacion-de-sulfuros-de-cobre/ dated Oct. 23, 2016 (10 pages) along with English translation (1 page); retrieved Dec. 6, 2018.

Written Opinion of the International Preliminary Examining Authority issued by the European Patent Office acting as the International Preliminary Examining authority in relation to International Application No. PCT/FI2017/050094 dated Dec. 21, 2018 (6 pages).

International Search Report issued by the Finnish Patent and Registration Office acting as the International Searching Authority in relation to International Application No. PCT/FI2017/050094 dated Jun. 9, 2017 (6 pages).

Written Opinion of the International Searching Authority issued by the Finnish Patent and Registration Office acting as the International Searching Authority in relation to International Application No. PCT/FI2017/050094 dated Jun. 9, 2017 (7 pages).

International Preliminary Report on Patentability issued by the European Patent Office acting as the International Preliminary Examining Authority in relation to International Application No. PCT/FI2017/050094 dated Jun. 13, 2019 (6 pages).

Weibo Hu, "Flotation", Metallurgical Industry Press, Oct. 31, 1989, pp. 238-239 (5 pages).

Office Action issued by the China National Intellectual Property Administration in relation to Chinese Application No. 201780086065.4 dated Sep. 28, 2021 (19 pages) along with English language translation (6 pages).

Supplementary European Search Report issued by the European Patent Office in relation to European Application No. EP 18 75 3952 dated Nov. 17, 2020 (2 pages).

Supplementary European Search Report issued by the European Patent Office in relation to European Application No. EP 18 75 3731 dated Nov. 17, 2020 (2 pages).

Supplementary Search Report issued by the Chinese Patent Office in relation to Chinese Application No. 2019101142799 dated Oct. 24, 2021 (2 pages).

First Search Report issued by the Chinese Patent Office in relation to Chinese Application No. 2019101142799 dated Nov. 13, 2020 (2 pages).

Supplementary Search Report issued by the Chinese Patent Office in relation to Chinese Application No. 2019101140238 dated Oct. 24, 2021 (1 page).

First Search Report issued by the Chinese Patent Office in relation to Chinese Application No. 2019101140238 dated Nov. 13, 2020 (2 pages).

First Search Report issued by the Chinese Patent Office in relation to Chinese Application No. 2017800860654 dated Nov. 22, 2020 (2 pages).

* cited by examiner

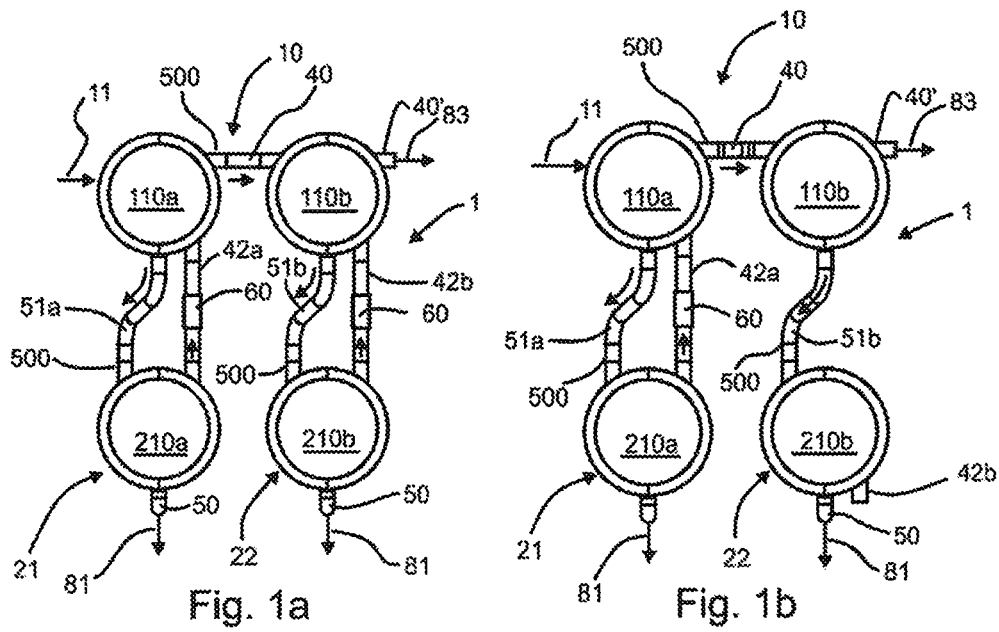
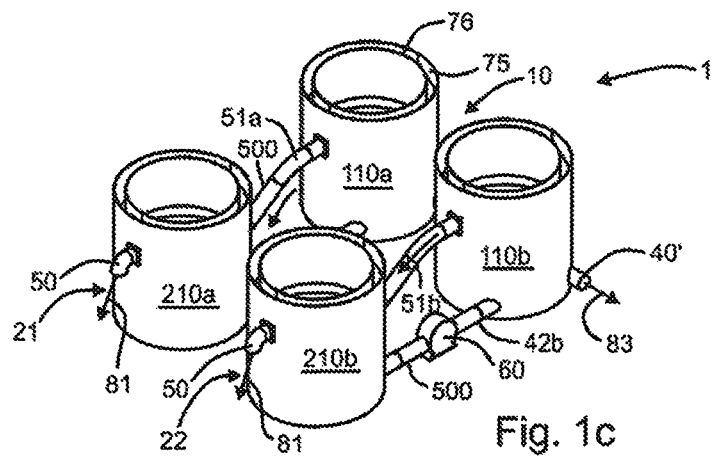
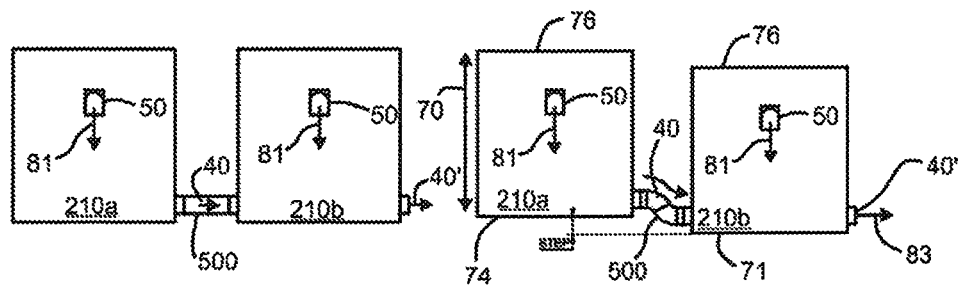

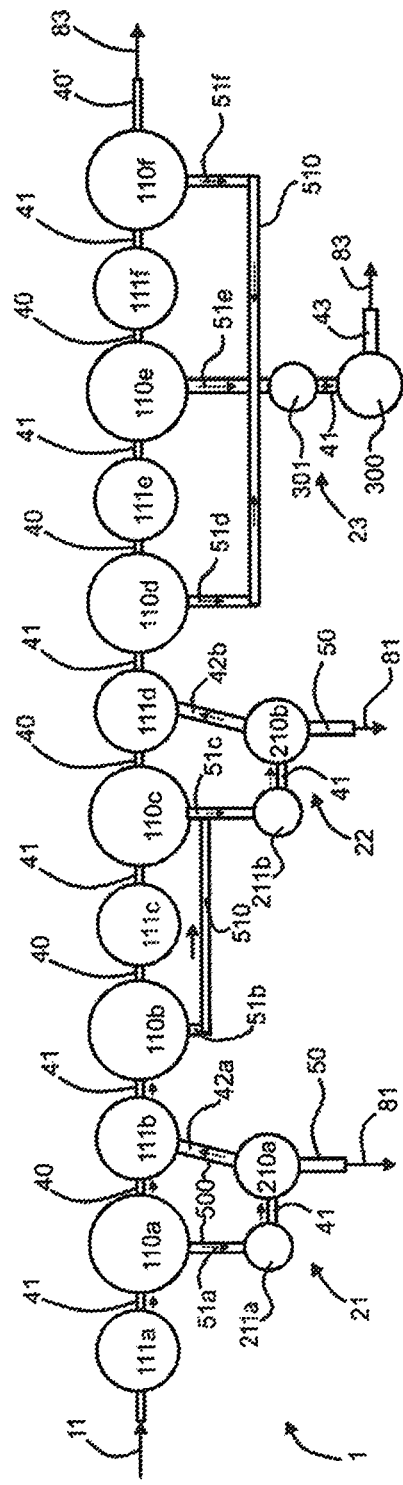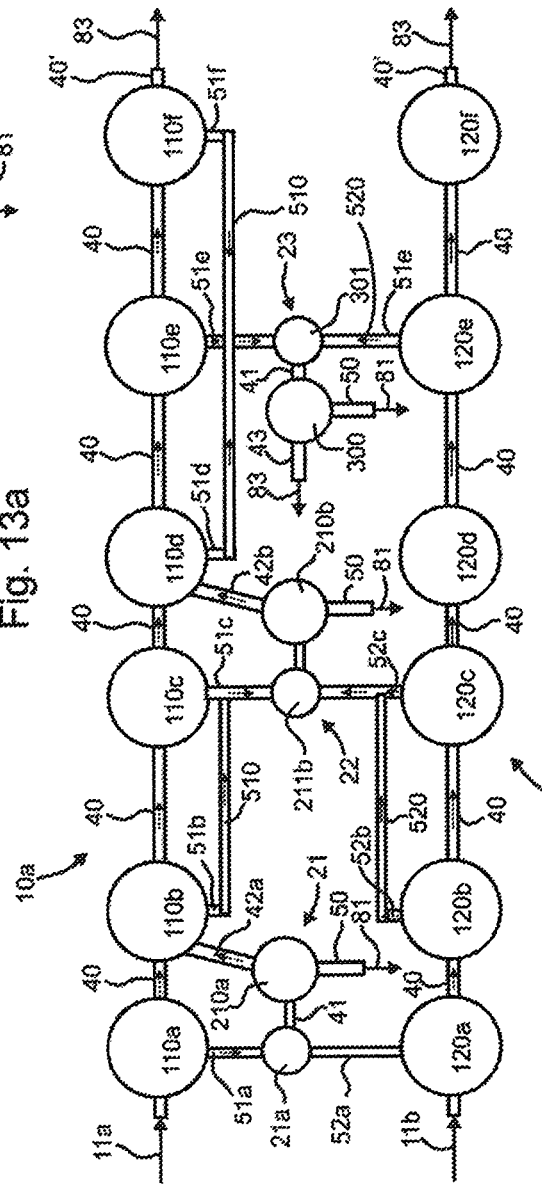
Fig. 13a
Fig. 13b

FLOTATION ARRANGEMENT, ITS USE, A PLANT AND A METHOD

CROSS-REFERENCE TO RELATED APPLICATIONS

This application is a national phase entry under 35 U.S.C. 371 of PCT International Application No. PCT/FI2017/050094 filed Feb. 15, 2017, the disclosure of this application is expressly incorporated herein by reference in its entirety.

TECHNICAL FIELD

The current disclosure relates to a flotation arrangement and its use, to a flotation plant, and to a flotation method for separating valuable metal containing ore particles from ore particles suspended in slurry.

SUMMARY OF THE INVENTION

A flotation arrangement is provided for treating mineral ore particles suspended in slurry. The arrangement comprises flotation cells for the separation of the slurry into an underflow and an overflow. The separation is performed with the help of flotation gas. The arrangement comprises a primary line comprising at least two primary flotation cells connected in series, wherein each subsequent primary flotation cell is arranged to receive underflow from the previous primary flotation cell; and a first secondary line comprising a secondary flotation cell in fluid communication with at least one first primary flotation cell and arranged to receive primary overflow of the at least one first primary flotation cell for the recovery of a first concentrate. Further, the arrangement comprises a further secondary line downstream of the first secondary line, the further secondary line comprising a secondary flotation cell in fluid communication with a further primary flotation cell and arranged to receive primary overflow of the further primary flotation cell for the recovery of the first concentrate. The arrangement is characterized in that underflow from a secondary line is arranged to flow to the last of the at least one primary flotation cells from which the primary overflow was received, or to a primary flotation cell downstream of the last of the at least one primary flotation cells from which the primary overflow was received.

The use of a flotation arrangement according to the present disclosure is intended to be employed in recovering mineral ore particles comprising a valuable mineral.

The flotation plant according to the invention comprises a flotation arrangement according to the present disclosure.

The flotation method for treating mineral ore particles suspended in slurry comprises subjecting the slurry to at least two stages of primary flotation in series for separating the slurry into a primary underflow and a primary overflow, wherein primary underflow from a stage of primary flotation is directed to a subsequent further stage of primary flotation. After a stage of primary flotation, at least one first primary overflow is directed to at least one stage of first secondary flotation for the recovery of a first concentrate. After a further stage of primary flotation, at least one further primary overflow is directed to at least one stage of further secondary flotation for the recovery of the first concentrate. The flotation method is characterized in that underflow from a stage of secondary flotation is directed to primary flotation in the last of the at least one stage of primary flotation from which the primary overflow was received, or to a downstream stage of primary flotation.

With the invention described herein, the focus of treatment of slurry may be shifted on efficient separation of valueless fraction from the ore particles and recovering a maximal amount of valuable particles. In other words, ore particles comprising very small or even minimal amounts of valuable material may be recovered for further processing/treatment. This may be especially beneficial for ores of poor quality, i.e. ores with very little valuable material initially, for example from poor mineral deposits which may have previously been considered economically too insignificant to justify utilization. When the underflow from the secondary flotation tanks is returned downstream into the primary line, in the direction of the flow of slurry, by gravity or by low-head pumping, energy consumption can be curbed while still achieving very efficient recovery of valuable mineral. It is possible to achieve a high grade for a part of the slurry stream, and at the same time, high recovery for the entire slurry stream passing through the flotation arrangement. Directing the underflow from a secondary line downstream, energy-intensive pumping may be avoided. Retreatment of the slurry flow in a number of adjoining flotation cells in this manner ensures effective recovery of mineral without any significant increase in energy consumption, as the flows of slurry need not be pumped in energy-consuming ways, but by utilizing the inherent hydraulic head of the downstream flows of slurry within the flotation arrangement and plant. The slurry is returned for further treatment into a position in the flotation arrangement where similar slurry is already being treated.

In the beginning or forward end of the flotation arrangement, it is thus possible to recover high grade of ore particle comprising valuable mineral, whereas in the end of the flotation arrangement may be utilized for recovering as much as possible of the ore particles comprising even a small amount of the valuable mineral. The grade of the overflow is increased by the utilization of the secondary flotation lines, while especially the primary line ensures efficient overall recovery of ore particles comprising valuable mineral. The flotation arrangement enables increasing the grade without high-energy pumping, thus providing significant advantages over the state of the art.

The flotation arrangement, its use, the flotation plant, and the flotation method according to the invention has the technical effect of allowing the flexible recovery of various particle sizes, as well as efficient recovery of valuable mineral containing ore particles from poor ore raw material with relatively low amounts of valuable mineral initially. The advantages provided by the structure of the flotation line allow the accurate adjustment of the flotation line structural parameters according to the target valuable material at each installation.

By treating the slurry according to the present invention as defined by this disclosure, recovery of valuable material containing particles may be increased. The initial grade of recovered material may be lower, but the material (i.e. slurry) is also thus readily prepared for further processing, which may include for example regrinding and/or cleaning.

Arranging flotation lines so that at least some, or all flotation cells (i.e. the bottoms of the flotation cells) are on same level increases construction speed, simplifies planning and construction and thus reduces costs. This so-called uniplanarity of flotation cells or flotation lines might offer advantages through reduction of investment costs, as setting up a plant requires less ground work and less space. This might be especially advantageous when the flotation cell size is increased. This again, might be desirable from the perspective of optimizing process performance while reducing capital costs for the investment. In case the flotation cells are arranged in a uniplanar fashion, the flow of slurry from on flotation cell to the following flotation cell may be achieved by pumping action, for example by low-head pumps.

According to some embodiments of the invention, the flotation lines may also be arranged in a stepwise fashion, so that at least some of the flotation cells (i.e. the bottoms of the flotation cells), either in the primary flotation line or in the secondary flotation line are positioned at different levels: for example, the bottom of the first primary flotation cell of the primary flotation line may be arranged higher than the bottom of the following further primary flotation cell(s), and/or higher than the bottom of the first secondary flotation cell into which the overflow from the first primary flotation cell is directed. In that way, the slurry surface level of at least some of the flotation cells following the first primary flotation cells is lower, thus creating a step between any two subsequent flotation cells in direct fluid connection with each other. The thus-created step allows achieving a hydrostatic head or hydrostatic pressure differential (hydraulic gradient) between the two subsequent flotation cells, whereby the flow of slurry from one cell to the next may be realized by gravitational force, without any separate pumps. The hydraulic gradient forces the flow of slurry towards the tailings outlet or outlets of the flotation line. This may reduce the need for additional pumping. Further, pumping power requirement might be reduced as material flow is directed downstream gravitationally due to drop in slurry surface levels. This can apply even to embodiments in which the slurry surface levels of adjacent flotation cells in the flotation line are at one level. The decreased need of energy-intensive pumping will lead to savings in energy consumption, as well as simplified construction of the flotation operation, and to less need of space for the construction.

By directing the at least one first primary overflow directly to at least one stage of first secondary flotation for the recovery of a first concentrate is meant that the process comprises no grinding step in between the primary flotation stage and the secondary flotation stage. By eliminating the grinding step, the hydraulic head of slurry flow is not lost between any two subsequent stage, and gravity only may be used to drive the flow of slurry. The first primary overflow may thus be separated from the lower quality further primary overflow. The first primary overflow may be subjected to flotation separately from the further primary overflow, which increases the recovery of ore particles comprising valuable mineral.

In this disclosure, the following definitions are used regarding flotation. Flotation involves phenomena related to the relative buoyancy of objects. Flotation is a process for separating hydrophobic materials from hydrophilic materials by adding flotation gas, for example air, to the process. Flotation could be made based on natural hydrophobic/hydrophilic difference or based on hydrophobic/hydrophilic differences made by addition of a surfactant or collector chemical. Gas can be added to the feedstock subject of flotation (slurry or pulp) by a number of different ways.

Basically, flotation aims at recovering a concentrate of ore particles comprising a valuable mineral. By concentrate herein is meant the part of slurry recovered in an overflow or underflow led out of a flotation cell. By valuable mineral is meant any mineral, metal or other material of commercial value.

Flotation involves phenomena related to the relative buoyancy of objects. The term flotation includes all flotation techniques. Flotation can be for example froth flotation, dissolved air flotation (DAF) or induced gas flotation. Froth flotation is a process for separating hydrophobic materials from hydrophilic materials by adding gas, for example air, to process. Froth flotation could be made based on natural hydrophilic/hydrophobic difference or based on hydrophilic/hydrophobic differences made by addition of a surfactant or collector chemical. Gas can be added to the feedstock subject of flotation (slurry or pulp) by a number of different ways.

By a flotation arrangement herein is meant an assembly comprising a number, at least two, flotation units or flotation cells that are arranged in fluid connection with each other for allowing either gravity-driven or pumped slurry flow between flotation cells, to form a flotation line. The arrangement is meant for treating mineral ore particles suspended in slurry by flotation. Thus, valuable metal-containing ore particles are recovered from ore particles suspended in slurry. Slurry is fed through a feed inlet to the first flotation cell of the flotation line for initiating the flotation process. Flotation arrangement may be a part of a larger flotation plant containing one or more flotation arrangements. Therefore, a number of different pre-treatment and post-treatment devices may be in operational connection with the components of the flotation arrangement, as is known to the person skilled in the art.

By flotation line herein is meant a part of the flotation arrangement where a number of flotation cells are arranged in fluid connection with each other so that the underflow of each preceding flotation cell is directed to the following flotation cell as a infeed until the last flotation cell of the flotation line, from which the underflow is directed out of the line as tailings or reject flow.

The flotation cells in a flotation arrangement are fluidly connected to each other. The fluid connection may be achieved by different lengths of conduits such as pipes or tubes, the length of the conduit depending on the overall physical construction of the flotation arrangement.

Alternatively, the flotation cells may be arranged in direct cell connection with each other. By direct cell connection herein is meant an arrangement, whereby the outer walls of any two subsequent flotation cells are connected to each other to allow an outlet of a first flotation cell to be connected to the inlet of the subsequent flotation cell without any separate conduit. A direct contact reduces the need for piping between two adjacent flotation cells. Thus, it reduces the need for components during construction of the flotation line, speeding up the process. Further, it might reduce sanding and simplify maintenance of the flotation line.

The fluid connection between flotation cells and flotation units may be direct, i.e. the two flotation cells (belonging to the same or different flotation lines) may be immediately adjacent to each other. Alternatively, the two flotation cells may be positioned at a distance from each other and connected through a pipe, channel or other means known in the art. The fluid connection between flotation cells may comprise various regulation mechanisms.

By "neighboring", "adjacent", or "adjoining" flotation cell herein is meant the flotation cell immediately following or preceding any one flotation cell, either downstream or upstream, or either in a primary line, in a secondary line, or the relationship between a flotation cell of a primary line and a flotation cell of a secondary line into which the overflow from the flotation cell of the primary line is directed.

By a flotation cell is herein meant a tank or vessel in which a step of a flotation process is performed. A flotation cell is typically cylindrical in shape, the shape defined by an outer wall or outer walls. The flotation cells regularly have a circular cross-section. The flotation cells may have a polygonal, such as rectangular, square, triangular, hexagonal or pentagonal, or otherwise radially symmetrical cross-section, as well. The number of flotation cells may vary according to a specific flotation arrangement and/or operation for treating a specific type and/or grade of ore, as is known to a person skilled in the art. In connection with the method for flotation according to the present invention, by flotation stage herein is meant the flotation process taking place in one flotation cell.

The flotation cell may be a froth flotation cell, such as a mechanically agitated cell or tank cell, a column flotation cell, a Jameson cell, or a dual flotation cell. In a dual flotation cell, the cell comprises at least two separate vessels, a first mechanically agitated pressure vessel with a mixer and a flotation gas input, and a second vessel with a tailings output and an overflow froth discharge, arranged to receive the agitated slurry from the first vessel.

The flotation cell may also be an overflow flotation cell operated with constant slurry overflow. In an overflow flotation cell, the slurry is treated by introducing flotation gas bubbles into the slurry and by creating a continuous upwards flow of slurry in the vertical direction of the first flotation cell. At least part of the valuable metal containing ore particles are adhered to the gas bubbles and rise upwards by buoyancy, at least part of the valuable metal containing ore particles are adhered to the gas bubbles and rise upwards with the continuous upwards flow of slurry, and at least part of the valuable metal containing ore particles rise upwards with the continuous upwards flow of slurry. The valuable metal containing ore particles are recovered by conducting the continuous upwards flow of slurry out of the at least one overflow flotation cell as slurry overflow. As the overflow cell is operated with virtually no froth depth or froth layer, effectively no froth zone is formed on the surface of the pulp at the top part of the flotation cell. The froth may be non-continuous over the cell. The outcome of this is that more valuable mineral containing ore particles may be entrained into the concentrate stream, and the overall recovery of valuable material may be increased.

Depending on its type, the flotation cell may comprise a mixer for agitating the slurry to keep it in suspension. By a mixer is herein meant any suitable means for agitating slurry within the flotation cell. The mixer may be a mechanical agitator. The mechanical agitator may comprise a rotor-stator with a motor and a drive shaft, the rotor-stator construction arranged at the bottom part of the flotation cell. The cell may have auxiliary agitators arranged higher up in the vertical direction of the cell, to ensure a sufficiently strong and continuous upwards flow of the slurry.

By overflow herein is meant the part of the slurry collected into the launder of the flotation cell and thus leaving the flotation cell. The overflow may comprise froth, froth and slurry, or in certain cases, only or for the largest part slurry. In some embodiments, the overflow may be an accept flow containing the valuable material particles collected from the slurry. In other embodiments, the overflow may be a reject flow. This is the case in when the flotation process, plant and/or method is utilized in reverse flotation.

By underflow herein is meant the fraction or part of the slurry which is not floated into the surface of the slurry in the flotation process. In some embodiments the underflow may be a reject flow leaving a flotation cell via an outlet which typically is arranged in the lower part of the flotation cell. Eventually the underflow from the final flotation cell of a flotation line or a flotation arrangement may leave the entire arrangement as a tailings flow or final residue of a flotation plant. In some embodiments, the underflow may be an accept flow containing the valuable mineral particles. This is the case in when the flotation arrangement, plant and/or method is utilized in reverse flotation.

By reverse flotation herein is meant an inverse flotation process typically utilized in the recovery of iron. In that case, the flotation process is directed for collecting the non-valuable part of the slurry flow into the overflow. The overflow in reverse flotation process for iron contains typically silicates, while the valuable iron-containing mineral particles are collected in the underflow. Reverse flotation may also be used for industrial minerals, i.e. geological mineral mined for their commercial values which are not fuel, nor sources of metals, such as bentonite, silica, gypsum, and talc.

By downstream herein is meant the direction concurrent with the flow of slurry (forward current, denoted in the figures with arrows), and by upstream herein is meant the direction countercurrent with or against the flow of slurry.

By concentration herein is meant the floated part or fraction of slurry of ore particles comprising a valuable mineral. A first concentration may comprise ore particles comprising one valuable mineral, where as a second concentration may comprise ore particles comprising another valuable mineral. Alternatively, the distinctive definitions first, second, may refer to two concentrations of ore particles comprising the same valuable mineral but two distinctly different particle size distributions.

By pre-treatment and/or post-treatment and/or further processing is meant for example comminution, grinding, separation, screening, classification, fractioning, conditioning or cleaning, all of which are conventional processes as known to a person skilled in the art. A further processing may include also at least one of the following: a further secondary flotation cell, which may be a conventional cleaner flotation cell, a recovery cell, a rougher, or a scavenger cell.

In an embodiment of the flotation arrangement, the secondary flotation cell of the first secondary flotation line and/or the secondary flotation cell of the further secondary flotation line are in direct fluid communication with the first primary flotation cell from which they are arranged to receive the overflow.

By direct fluid communication herein is meant that any two neighboring or adjacent or adjoining flotation cells are so connected that there are no additional process steps such as grinding arranged in between any two flotation cells or flotation stages. This is not to be mixed up with the definition direct cell connection above.

In certain cases of conventional froth flotation process, the overflow of a first flotation cell may be directed initially to a re-grinding step, or to other further processing step before it is directed into a secondary flotation cell.

In the flotation arrangement, plant and method according to the present invention, such further processing step may be forgone, and the primary flotation cell, from which the overflow is directed into a secondary flotation cell, and that secondary flotation cell may thus be in direct fluid connection with each other. There may be a similar direct fluid communication arranged between any other two flotation cell of the flotation arrangement, as well.

In an embodiment of the flotation arrangement, the underflow from a secondary line is arranged to flow to a primary flotation cell after which there are at least two more primary flotation cells in the primary flotation line.

In this kind of flotation arrangement, it may be possible to ensure high recovery for the ore particles comprising valuable mineral still present in the slurry.

In an embodiment of the flotation arrangement, the primary line comprises at least three primary flotation cells, or 3-10 flotation cells, or 4-7 flotation cells.

Having a sufficient number of primary flotation cells allows the production of high grade for part of the concentrate, and at the same time, ensuring high recovery of the desired valuable mineral throughout the primary line, thus avoiding having any of the valuable mineral ending up in the tailings flow. As much as possible of the ore particles comprising valuable mineral may be floated while still minimizing the required pumping energy to achieve this.

In an embodiment of the flotation arrangement, the first secondary line comprises 1-4 secondary flotation cells, or 1-2 secondary flotation cells, or one secondary flotation cell.

In an embodiment of the flotation arrangement, the further secondary line comprises 1-4 secondary flotation cells, or 1-3 secondary flotation cells, or 1-2 secondary flotation cells.

Even a small number of secondary flotation cells may be sufficient for cleaning the overflow from primary flotation cells to a reasonable level, i.e. increasing the grade of the concentrate recovered from the primary line. The underflow even from a low number of secondary flotation cells has a high enough volume to be sent to further treatment in the primary line to further increase the recovery.

In an embodiment of the flotation arrangement, the number of secondary flotation cells in series in the further secondary line is the same or higher than the number of secondary flotation cells in series in the first secondary line.

The overflow from a primary cell or cells going to the first secondary flotation line may have higher quality (i.e. higher grade) than the overflow from the later primary flotation cells going to the further secondary line. The further secondary flotation line may thus need more capacity for treating the slurry efficiently. Further, having excessive treatment in the first secondary flotation line may lead to increased pumping requirements, which would lead to undesired increased energy consumption. The effect of this kind of embodiment is that while engaging in minimum pumping to drive the flows of slurry, at least a part of the concentrate may be recovered with very high grade.

In an embodiment of the flotation arrangement, a further secondary line is arranged to receive primary overflow from 1-3 primary flotation cells, or from 1-2 primary flotation cells.

In this way, the overflows of different primary flotation cells are not mixed to a very high degree. Each overflow may then be treated in the best possible way to ensure sufficient treatment, and only a small number of secondary flotation cells acting as recovery cells are needed to achieve a high grade concentrate.

In an embodiment of the flotation arrangement, the first secondary cell of the first secondary line has a larger volume than the first secondary cell of the further secondary line.

The first primary cells may have a concentrate of a higher grade in its overflow than the later primary flotation cells in the primary flotation line. The overflows from those later primary flotation cells may then be treated in smaller flotation cells, having thus a shorter flotation time. This kind of arrangement may ensure a concentrate of a higher grade also from the further secondary line.

In an embodiment of the flotation arrangement the first primary flotation cell is at least 100 m$^3$ in volume, or at least 500 m$^3$ in volume, or at least 1000 m$^3$ in volume.

In an embodiment of the flotation arrangement, the second primary flotation cell is at least 100 m$^3$ in volume, or at least 300 m$^3$ in volume, or at least 500 m$^3$ in volume.

Utilizing flotation cells with a volumetric size of at least 400 m3 increases the probability of collisions between gas bubbles created into the flotation cells for example by means of a rotor, and the particles comprising valuable mineral, thus improving the recovery rate for the valuable mineral, as well as the overall efficiency of the flotation arrangement. Larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher. These kinds of primary flotation cells act as a kind of roughener cells ensuring high grade, while the later primary flotation cells in the primary flotation line act somewhat similarly to conventional scavenger cells.

In an embodiment of the flotation arrangement, the second primary flotation cell is equal in volume as the first primary flotation cell, or smaller in volume that the first primary flotation cell.

In an embodiment of the flotation arrangement, the secondary flotation cell of the first secondary line in fluid communication with a primary flotation cell is 100-1000 m3 in volume, or 400-1000 m3 in volume.

Utilizing flotation cells with a volumetric size of at least 400 m3 increases the probability of collisions between gas bubbles created into the flotation cells for example by means of a rotor, and the particles comprising valuable mineral, thus improving the recovery rate for the valuable mineral, as well as the overall efficiency of the flotation arrangement. As mentioned above, larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher.

In an embodiment of the flotation arrangement, the secondary flotation cell of the further secondary line in fluid communication with a primary flotation cell is 100-1000 m3 in volume, or 300-1000 m3 in volume.

Utilizing flotation cells with a volumetric size of at least 300 m3 increases the probability of collisions between gas bubbles created into the flotation cells for example by means of a rotor, and the particles comprising valuable mineral, thus improving the recovery rate for the valuable mineral, as well as the overall efficiency of the flotation arrangement.

In an arrangement where there is a secondary flotation line cleaning the overflow of a primary flotation cell, and where the underflow from that secondary flotation line is led back to a later primary flotation cell downstream, it is important to get a higher grade from the primary flotation cell than to get a high recovery of ore particles comprising valuable mineral in the overflow of the primary flotation cell. This is because the underflow from the secondary flotation line may be re-treated in the primary flotation line where any remaining ore particles comprising valuable mineral are then recovered. While some valuable material is directed back into the primary flotation line, the energy required by pumping the underflow back into the primary flotation line is not crucial, as the later primary flotation cells guarantee that recovery is made. Therefore very large flotation cells of up to 1000 $m^3$ in volume may be used. Using flotation cells larger than 1000 $m^3$ is not preferable, since it is hard to achieve efficient mixing into a cell that large. Without efficient mixing, ore particles comprising relatively small amounts of valuable mineral drop back into the bottom of the flotation cell, which affects the recovery rate negatively.

With a flotation arrangement of the above embodiments, it may be possible to produce or recover at least some part of the concentrate with very high grade.

In case the first primary flotation cells have a relatively large volume, there may be no need for large subsequent flotation cells, but rather, the flotation cells (primary or secondary) downstream from the first primary cell or cells may be smaller and therefore more efficient. In flotation processes of certain minerals, it may be easy to float a significant part of the ore particles comprising valuable mineral with high grade. In that case it may be possible to have flotation cells of smaller volume downstream in the primary line and still achieve high recovery rate.

In an embodiment of the flotation arrangement, the volume of the secondary flotation cell of the first secondary line in fluid communication with at least one primary flotation cell is 2-50% of the aggregate volume of the at least one primary flotation cell, or 3-30% of the aggregate volume of the at least one primary flotation cell.

In an embodiment of the flotation arrangement, the volume of the secondary flotation cell of the further secondary line in fluid communication with at least one primary flotation cell is 2-50% of the aggregate volume of the at least one primary flotation cell, or 3-30% of the aggregate volume of the at least one primary flotation cell.

In such embodiments, a part of the concentrate is produced with high grade. When the secondary flotation cells of the secondary flotation line or lines are smaller, the residence time of ore particles within the flotation cell is lower, i.e. there is less time to float the desired concentrate. The thus achieved concentrate has therefore a higher grade.

Constructing the flotation cell or cells of the secondary flotation lines in the direction of the slurry flow smaller than the flotation cell or cells in the primary flotation unit might provide efficiency benefits. The effect might be especially pronounced if the flotation cell or flotation cells in the secondary flotation line are at least 10% smaller than in the primary flotation line. For example, it is possible that the at least one flotation cell of the secondary flotation line is at least 20 or 30% smaller than the at least one flotation cell of the primary flotation line.

In an embodiment of the flotation arrangement, the flow of slurry is driven by gravity, or by one or more low-head pumps, or by gravity and by one or more low-head pumps.

In an embodiment of the flotation arrangement, the flow of the slurry to and/or away from a secondary flotation cell is driven by gravity, or by one or more low-head pumps, or by gravity and by one or more low-head pumps.

In a further embodiment of the flotation arrangement, the flow of the slurry to and/or away from two secondary flotation cells is driven by gravity, or by one or more low-head pumps, or by gravity and by one or more low-head pumps.

In an embodiment of the flotation arrangement, primary overflow from a primary flotation cell is driven by gravity, or the primary overflow from at least two primary flotation cells is driven by gravity.

In an embodiment of the flotation arrangement, overflow from a secondary flotation cell is driven by gravity, or overflow from at least two secondary flotation cells is driven by gravity.

In an embodiment of the flotation arrangement, overflow from each secondary flotation cell is driven by gravity.

In an embodiment of the flotation arrangement, underflow from a primary flotation cell is driven by gravity, or the underflow from at least two primary flotation cells is driven by gravity.

In an embodiment of the flotation arrangement, underflow from a secondary flotation cell is driven by gravity, or underflow from at least two secondary flotation cells is driven by gravity.

In an embodiment of the flotation arrangement, underflow from each primary flotation cell is driven by gravity.

In an embodiment of the flotation arrangement, underflow from each secondary flotation cell is driven by gravity.

By arranging the flow of slurry be driven by gravity, savings in energy consumption may be achieved as no additional pumping is required to drive the slurry downstream.

By avoiding energy-intensive pumping in flotation arrangement, significant savings in energy may be achieved, while, at the same time, ensuring efficient recovery of valuable mineral material from ores of poor quality, i.e. comprising even very little valuable mineral to start with. It may be possible to produce some part of the concentration with high grade, but also, at the same time have a good overall recovery of the desired valuable mineral. Only insignificant amounts of the valuable mineral may end up in the tailing flow.

The invention at hand aims at improving the mineral recovery process while decreasing energy consumption of the process. This is made possible by utilizing the inherent flows of slurry of the process, i.e. by moving the slurry flow into retreatment in downstream flotation cells. By arranging the flotation process thus, it is possible to direct the flow of slurry by gravity, or by low-intensity pumping only, or by a suitable combination of the two. For example, it is possible to handle the flow of slurry by a low-head pump or gravity, when the underflow from a secondary line is arranged to flow to the last one of the primary flotation cells from which the primary overflow was received, or to a primary flotation cell downstream of the last of the at least one primary flotation cells from which the primary overflow was received.

In an embodiment of the flotation arrangement, primary overflow from a primary flotation cell is driven by a low-head pump, or the primary overflow from at least two primary flotation cells is driven by a low-head pump.

In an embodiment of the flotation arrangement, overflow from a secondary flotation cell is driven by a low-head pump, or overflow from at least two secondary flotation cells is driven by a low-head pump.

In an embodiment of the flotation arrangement, overflow from each secondary flotation cell is driven by a low-head pump.

In an embodiment of the flotation arrangement, underflow from a primary flotation cell is driven by a low-head pump, or the underflow from at least two primary flotation cells is driven by a low-head pump.

In an embodiment of the flotation arrangement, underflow from a secondary flotation cell is driven by a low-head pump, or underflow from at least two secondary flotation cells is driven by a low-head pump.

In an embodiment of the flotation arrangement, underflow from each primary flotation cell is driven by a low-head pump.

In an embodiment of the flotation arrangement, underflow from each secondary flotation cell is driven by a low-head pump.

By low-head pump herein is meant any type of pump producing a low pressure for driving a flow of slurry downstream. Typically, a low-head pump produces a maximum head of up to 1.0 meters, i.e. may be used to drive the flow of slurry between two adjoining flotation cells with less than 30 cm difference in slurry surface level. A low-head pump may typically have an impeller for creating an axial flow.

In an embodiment of the flotation arrangement, the underflow between two primary flotation cells is driven by gravity, overflow from the two primary flotation cells is arranged to flow to different secondary lines, and the slurry surface level in said primary flotation cells is different.

By slurry surface level herein is meant the height of the slurry surface within the flotation tank as measured from the bottom of the flotation cell to the launder lip of the flotation cell. In effect, the height of the slurry is equal to the height of a launder lip of a flotation cell as measured from the bottom of the flotation cell to the launder lip of the flotation cell. For example, any two subsequent flotation cells may be arranged in a stepwise fashion in a flotation line so that the slurry surface level of such flotation cells is different (i.e. the slurry surface level of the first of such flotation cells is higher than the slurry surface level of the second of such flotation cells). This difference in the slurry surface levels is defined herein as "step" between any two subsequent flotation cells. The step or the difference in slurry surface levels is a difference allowing the flow of slurry be driven by gravity or gravitation force, by creating a hydraulic head between the two subsequent flotation cells.

In an embodiment of the flotation arrangement, overflow from at least one primary flotation cell to which underflow from a further secondary flotation cell is directed to flow is arranged to flow into a further processing step.

By further processing herein is meant any suitable process step such as a grinding step or a chemical addition step, or any other process step typically utilized in connection with a flotation arrangement, and known to a person skilled in the art.

In an embodiment of the flotation arrangement, combined overflow of the at least one primary flotation cell to which underflow from a further secondary flotation cell is directed to flow and of at least one primary flotation cell downstream of the at least one flotation cell to which underflow from a further secondary flotation cell is directed to flow, is arranged to flow into the further processing step.

In an embodiment of the flotation arrangement, the further processing step comprises a grinding step.

The grinding step may comprise at least one grinding mill, which may be any suitable grinding mill as is known by a person skilled in the art In an embodiment of the flotation arrangement, the further processing step comprises an additional secondary flotation cell in fluid communication with at least one primary flotation cell and arranged to receive primary overflow from at least one primary flotation cell. Underflow from the additional secondary flotation cell is arranged to flow to a primary flotation cell up-stream of the at least one primary flotation cell from which the primary overflow was received, or to leave the flotation arrangement.

In a further embodiment of the flotation arrangement, the additional secondary flotation cell is arranged to receive primary overflow from at least two primary flotation cells, or from at least three primary flotation cells.

In yet another embodiment of the flotation arrangement, the additional secondary flotation cell is arranged in a position downstream from the at least one first secondary flotation line and the at least one further secondary flotation line.

The additional secondary flotation cell may act as a recovery cell. In effect, this kind of arrangement may prevent ore particles comprising valuable mineral from ending up in the tailings flow, thereby further ensuring good recovery of the desired concentrate.

By utilizing an additional secondary flotation cell it may be ensured that all available valuable mineral becomes recovered from the flow of slurry of the primary line into the overflow or concentrate. The loss of ore particles comprising valuable mineral may be minimized, further improving the recovery efficiency of froth the flotation arrangement and plant. Similarly, when using the flotation arrangement in reverse flotation, in the underflow from the primary line, as much of the ore particles comprising valuable material as possible may be recovered. The underflow from the additional secondary flotation cell may be directed to regrinding circuit or step for ensuring recovery of ore particles comprising valuable mineral from that flow of slurry, as well.

By arranging the underflow from the additional secondary flotation cell to flow to a primary cell upstream, it may be possible to make the operation of the flotation arrangement even more efficient, as the underflow is returned back into the beginning of the primary flotation line, thus ensuring recovery of as much valuable material as possible. Further, the need for pumping may be reduced at the same time as the underflows of secondary flotation lines becomes efficiently re-treated. Following this operation with an additional secondary flotation cell acting as a recovery cell, the significant part of the ore particles comprising valuable mineral may be effectively floated. From the primary line, at a location where the high grade concentrate has already been taken out, a sufficient amount of primary overflow may still be collected for efficiently floating the desired concentrate away. In addition, the underflow from the additional secondary flotation cell may be directed into a further processing step. The underflow may be especially suitable for a further grinding step.

By additional secondary flotation cell herein is meant a flotation cell from which the overflow is directed out of the flotation arrangement, for example directly to further processing step such as a grinding step or a frother step, and not back into the downstream primary flotation cells of the primary line, as is done in connection with the secondary flotation cells. In other words, the overflow of the additional secondary flotation cell is directed neither to the primary flotation cell from which the overflow for that cleaner cell was received from, nor to a primary flotation cell downstream. The underflow of the additional secondary flotation cell may be directed back upstream, into the first primary flotation cell of a primary flotation line, or to a primary flotation cell upstream from the primary flotation cell from which the overflow into the additional secondary flotation cell was received, or out of the flotation arrangement, either as tailings flow directed into further treatment outside the h flotation arrangement, for example regrinding, or as an infeed into another flotation arrangement for the recovery of a further concentration.

In an embodiment of the flotation arrangement, the underflow from a second secondary flotation cell of a secondary flotation line is arranged to flow to a primary flotation cell downstream from the primary flotation cell from which the primary overflow was received.

In a further embodiment of the flotation arrangement, there is one primary flotation cell arranged between the last primary flotation cell from which the primary overflow the secondary line was received and the primary flotation cell to which the underflow from the second secondary flotation cell is arranged to flow.

In an embodiment of the flotation arrangement, underflow from the first secondary flotation cell of a further secondary flotation line is arranged to flow to a primary flotation cell downstream of the last primary flotation cell from which the primary overflow to the secondary line was received.

In effect, any pumping required to drive the flow of slurry may be minimized, while the slurry is still being led to multiple treatment stages in the flotation arrangement. Further, slurry fractions with similar or same properties may be combined for further treatment. Primary underflow combined with a secondary line underflow may have very similar properties, for example the amount of ore particles still comprising valuable mineral, or ore particles of same size distribution. Thus, the operation of the flotation process may be optimized.

In an embodiment of the flotation arrangement, underflow from each secondary flotation cell in direct fluid communication with a primary flotation cell is arranged to flow to a downstream primary flotation cell.

As there is no steps in this kind of flotation line, is may be possible to maximize the utilization of gravity in driving the flow of slurry.

In an embodiment of the flotation arrangement, primary overflow from a primary flotation cell is arranged to flow into two parallel secondary flotation cells.

In an embodiment of the flotation arrangement, the flotation arrangement comprises two primary lines, and the first secondary line is arranged to receive overflow from the first primary cells of both primary lines.

In a further embodiment of the flotation arrangement, a further secondary line is arranged to receive overflow from the second primary cells of both primary lines.

In such arrangements, it may be possible to have a higher volume of slurry inflow into a secondary flotation line. Therefore it may be feasible to utilize flotation cells of larger volume also in the secondary line, benefits, mostly relating to efficiency, of which has already been discussed earlier in this disclosure.

In an embodiment of the flotation arrangement, the primary flotation cells and/or the secondary flotation cells comprise froth flotation cells.

In an embodiment of the flotation arrangement, flotation gas is fed into the flotation cell where the slurry is separated into the overflow and the underflow.

In a further embodiment of the flotation arrangement, flotation gas is fed into a preparation flotation cell in which a mixer is arranged.

By preparation flotation cell herein is meant a flotation vessel in which the slurry may be prepared for floating, typically by introducing flotation gas and by employing mechanical agitation, prior to the slurry being led into a second vessel where the actual flotation process takes place.

The preparation flotation cell may, for example, be the first vessel of a dual flotation cell described earlier in this disclosure.

In an embodiment of the flotation arrangement, the mineral ore particles comprise Cu, or Zn, or Fe, or pyrite, or metal sulfide such as gold sulfide.

An embodiment of the use of a flotation arrangement according to the invention is particularly intended for recovering mineral ore particles comprising a valuable mineral from low grade ore.

An embodiment of the use of a flotation arrangement according to the invention is intended for recovering mineral ore particles comprising Cu from low grade ore.

In an embodiment of the flotation plant, the plant comprises at least two, or at least three flotation arrangements according to the invention.

In an embodiment of the flotation plant, the plant comprises at least one flotation arrangement for the recovery of a first concentrate and at least one flotation arrangement for the recovery of a second concentrate.

In an embodiment of the flotation plant, the primary flotation cells of the primary line of the at least one flotation arrangement for the recovery of the first concentrate and the primary flotation cells of the primary line of the at least one flotation arrangement for the recovery of the second concentrate are arranged in series.

In an embodiment of the flotation plant, the plant further comprises an arrangement for further treating mineral ore particles suspended in slurry so that the second concentrate differs from the first concentrate.

In an embodiment of the flotation plant, the arrangement for further treating mineral ore particles suspended in slurry comprises a grinding step disposed between a first flotation arrangement and a second flotation arrangement.

In this case, the second concentrate recovered from the second flotation arrangement may have a similar mineralogy as the first concentrate recovered from the first flotation arrangement, but the particle size distribution of the slurry being led into the second flotation arrangement after the grinding step may be different.

In an embodiment of the flotation plant, the plant for further treating mineral ore particles suspended in slurry comprises an arrangement for the addition of flotation chemicals disposed between a first flotation arrangement and a second flotation arrangement.

In this case, the second concentrate recovered from the second flotation arrangement may have a different mineralogy from the first concentrate recovered from the first flotation arrangement, the use of flotation chemicals utilized determined naturally by the desired valuable mineral intended to be recovered by the second flotation arrangement.

In an embodiment of the flotation plant, a primary flotation line comprises 10 primary flotation cells, and wherein the overflow from the last of the primary flotation cells is arranged to flow into a secondary flotation line comprising an additional secondary flotation cell, and wherein the underflow from the additional secondary flotation cell is arranged to flow back into the 1-4 first primary floatation cells of the primary flotation line.

In an embodiment of the flotation plant, a flotation arrangement is arranged to recover mineral ore particles comprising Cu, and/or Zn, and/or pyrite, and/or a metal from a sulfide, such as gold.

In an embodiment of the flotation plant, the flotation arrangement is arranged to recover mineral ore particles comprising Cu from low grade ore.

For example, in recovering copper from low grade ores obtained from poor deposits of mineral ore, the copper amounts may be as low as 0.1% by weight of the feed, i.e. infeed of slurry into the flotation arrangement. The flotation arrangement according to the invention may be very practical for recovering copper, as copper is a so-called easily floatable mineral. In the liberation of ore particles comprising copper, it may be possible to get a relatively high grade from the first primary flotation cells without any extra pumping between the flotation cells.

By using the flotation arrangement according to the present invention, the recovery of such low amounts of valuable mineral, for example copper, may be efficiently increased, and even poor deposits cost-effectively utilized. As the known rich deposits have increasingly already been used, there is a tangible need for processing the less favorable deposits as well, which previously may have been left unmined due to lack of suitable technology and processes for recovery of the valuable material in very low amounts in the ore.

In a further embodiment of the flotation plant, a flotation arrangement is arranged to recover Fe by reverse flotation.

In reverse flotation, mineral ore particles comprising undesirable material are removed from the slurry by arranging the gas bubbles to adhere to those particles and removing them from the flotation cell in the overflow, whereas the valuable mineral material comprising ore particles are recovered in the underflow, thus inversing the conventional flotation flows of accept into overflow and reject into underflow. Typically in reverse flotation of Fe, the large mass pull of invaluable material, most commonly silicates, may cause significant problems in controlling the flotation process. Inevitably, some of the mineral ore particles comprising valuable Fe end up into the overflow (especially fine, light particles). By directing this overflow into a secondary flotation line for retreatment, at least some of the mineral ore particles comprising Fe can be processed into the underflow of the secondary flotation line and thus recovered.

Similarly, treatment of slurries for the recovery of such industrial minerals as bentonite, silica, gypsum, or talc, may be improved by using reverse flotation in the same manner as for Fe. In recovering industrial minerals, the goal of flotation may be, for example, the removal of dark particles into the overflow reject, and recovery of white particles into the underflow accept. In that kind of process, some of the lighter, finer white particles may end up into the overflow. Those particles could be efficiently recovered by the invention according to the present disclosure.

In an embodiment of the flotation method, the slurry is subjected to at least three stages of primary flotation, or to 3-10 stages of primary flotation, or to 4-7 stages of primary flotation.

In an embodiment of the flotation method, the at least one primary overflow is directed to 1-4 first stages of secondary flotation, or to 1-2 first stages of secondary flotation, or to one first stage of secondary flotation.

By a stage of secondary flotation herein is meant the flotation process taking place in a secondary flotation cell of a secondary flotation line.

In an embodiment of the flotation method, the at least one further primary overflow is directed to 1-4 second stages of secondary flotation, or to 1-2 second stages of secondary flotation, or to one second stage of secondary flotation.

In an embodiment of the flotation method, the flow of slurry is directed from one stage of flotation to a following stage of flotation by gravity, or by one or more low-head pumps, or by gravity and one or more low-head pumps.

In an embodiment of the flotation method, at least one primary overflow is directed to at least one stage of further processing.

In an embodiment of the flotation method, the stage of further processing comprises a grinding stage.

In an embodiment of the flotation method, the at least one stage of further processing comprises a stage of additional secondary flotation. The underflow from the at least one stage of additional secondary flotation is directed to the stage of primary flotation upstream of the at least one stage of primary flotation from which stage the primary overflow was received, or out of the flotation stages.

In an embodiment of the flotation method, primary overflow from at least two stages of primary flotation is directed to the stage of additional secondary flotation, or wherein primary overflow from at least three stages of primary flotation is directed to the stage of additional secondary flotation.

In one embodiment of the flotation method, the underflow from a second stage of secondary flotation is directed to a stage of primary flotation downstream from the stage of primary flotation from which the overflow to the second stage of secondary flotation was directed.

In one embodiment of the flotation method, the underflow from a first stage of secondary flotation is directed to a stage of primary flotation downstream of the last stage of primary flotation from which the primary overflow to the first stage of secondary flotation was directed.

In one embodiment of the flotation method, the underflow from a second stage of secondary flotation is directed to a stage of primary flotation downstream of the last stage of primary flotation from which the primary overflow to the second stage of secondary flotation was directed.

In one embodiment of the flotation method, primary overflow from a stage of primary flotation is directed to two parallel stages of secondary flotation.

In an embodiment of the flotation method, froth flotation is employed.

BRIEF DESCRIPTION OF THE DRAWINGS

The accompanying drawings, which are included to provide a further understanding of the current disclosure and which constitute a part of this specification, illustrate embodiments of the disclosure and together with the description help to explain the principles of the current disclosure. In the drawings:

FIGS. 1a and 1b are flow chart illustrations for embodiments of the invention.

FIG. 1c is a simplified schematic perspective projection for the embodiment of FIG. 1a.

FIGS. 1d and 1e are simplified illustrations showing the placement of flotation cells as seen from the direction of the secondary flotation cells of FIG. 1a or 1b.

FIG. 2b is a simplified schematic perspective projection for the embodiment of FIG. 2a.

FIG. 2c is a simplified illustration showing the relative vertical placement of flotation cells as seen from the direction of the secondary flotation cells of FIG. 2a.

FIG. 2d is a simplified illustration showing the relative placement of flotation cells as seen against the direction of flow of the primary flotation line of FIG. 2a.

FIG. 3b is a simplified schematic perspective projection for the embodiment of FIG. 3a.

FIG. 3c is a simplified illustration showing the relative vertical placement of flotation cells as seen from the direction of the secondary flotation cells of FIG. 3a.

FIG. 4b is a simplified schematic perspective projection for the embodiment of FIG. 4a.

FIG. 4c is a simplified illustration showing the relative vertical placement of flotation cells as seen from the direction of the secondary flotation cells of FIG. 4a.

FIG. 5b is a simplified schematic perspective projection for the embodiment of FIG. 5a.

FIG. 5c is a simplified illustration showing the relative vertical placement of flotation cells as seen from the direction of the secondary flotation cells of FIG. 5a.

FIG. 6b is a simplified schematic perspective projection for the embodiment of FIG. 6a.

FIG. 6c is a simplified illustration showing the relative vertical placement of flotation cells as seen from the direction of the secondary flotation cells of FIG. 6a.

FIG. 7b is a simplified schematic perspective projection for the embodiment of FIG. 7a.

FIG. 7c is a simplified illustration showing the relative vertical placement of flotation cells as seen from the direction of the secondary flotation cells of FIG. 7a.

FIG. 8b is a simplified schematic perspective projection for the embodiment of FIG. 8a.

FIG. 8c is a simplified illustration showing the relative vertical placement of flotation cells as seen from the direction of the secondary flotation cells of FIG. 8a.

FIG. 9b is a simplified schematic perspective projection for the embodiment of FIG. 9a.

FIG. 9c is a simplified illustration showing the relative vertical placement of flotation cells as seen from the direction of the secondary flotation cells of FIG. 9a.

FIG. 10b is a simplified schematic perspective projection for the embodiment of FIG. 10a.

FIG. 10c is a simplified illustration showing the relative vertical placement of flotation cells as seen from the direction of the secondary flotation cells of FIG. 10a.

FIG. 11b is a simplified schematic perspective projection for the embodiment of FIG. 11a.

FIG. 11c is a simplified illustration showing the relative vertical placement of flotation cells as seen from the direction of the secondary flotation cells of FIG. 11a.

FIG. 13a is a flow chart illustration for an embodiment of the invention.

FIG. 13b is a flow chart illustration for another embodiment of the invention.

FIG. 14b is a simplified illustration showing the relative vertical placement of flotation cells as seen from the direction of the secondary flotation cells of FIG. 14a.

DETAILED DESCRIPTION

Reference will now be made in detail to the embodiments of the present disclosure, an example of which is illustrated in the accompanying drawing.

The description below discloses some embodiments in such a detail that a person skilled in the art is able to utilize the arrangement, plant and method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

Figure 14A:
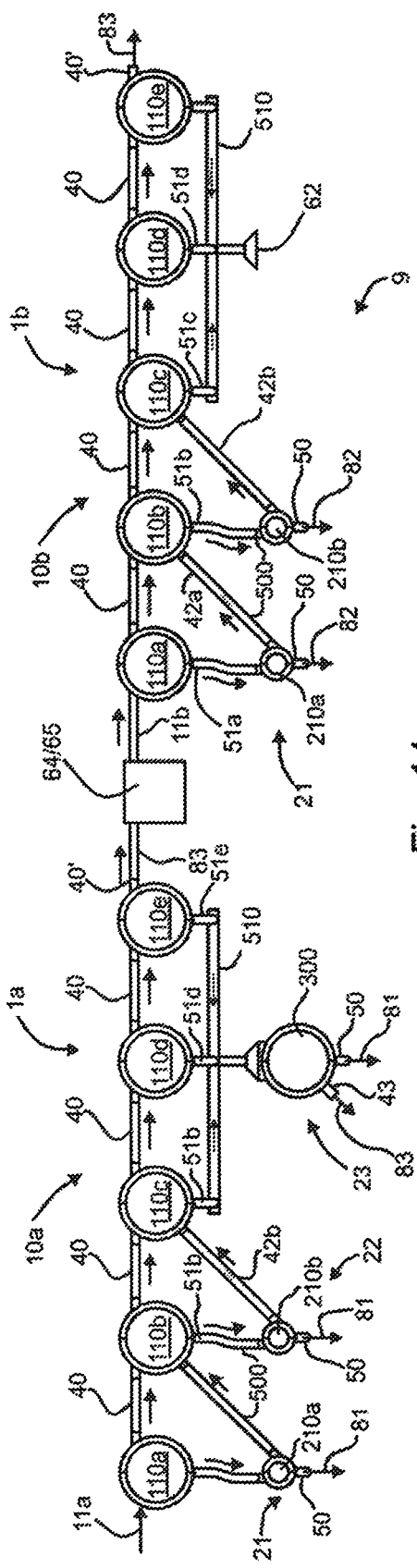
FIG. 14a is a flow chart illustration for another embodiment of a flotation plant according to an embodiment of the invention.
Figure 14B:
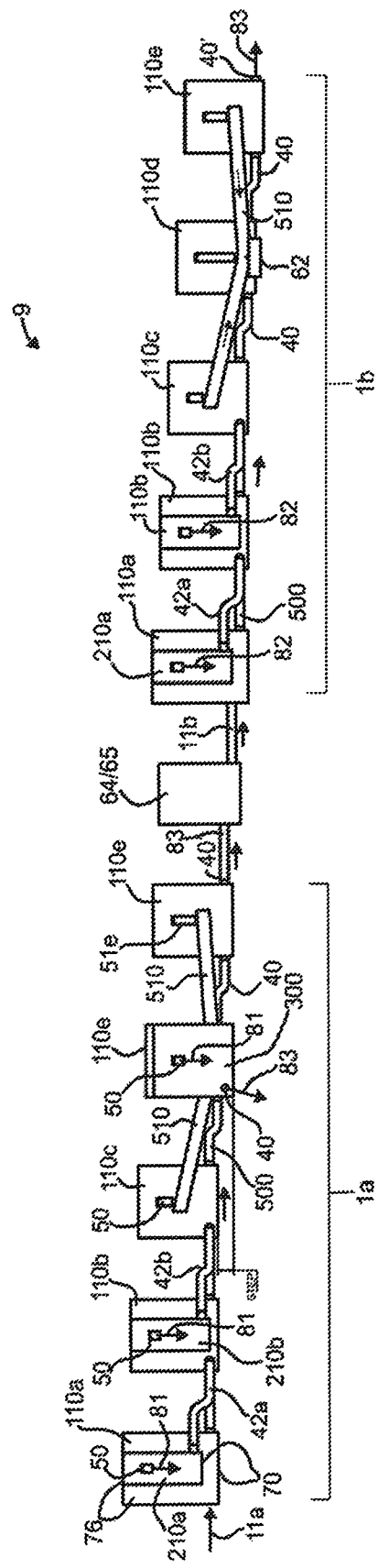
Figure 15:
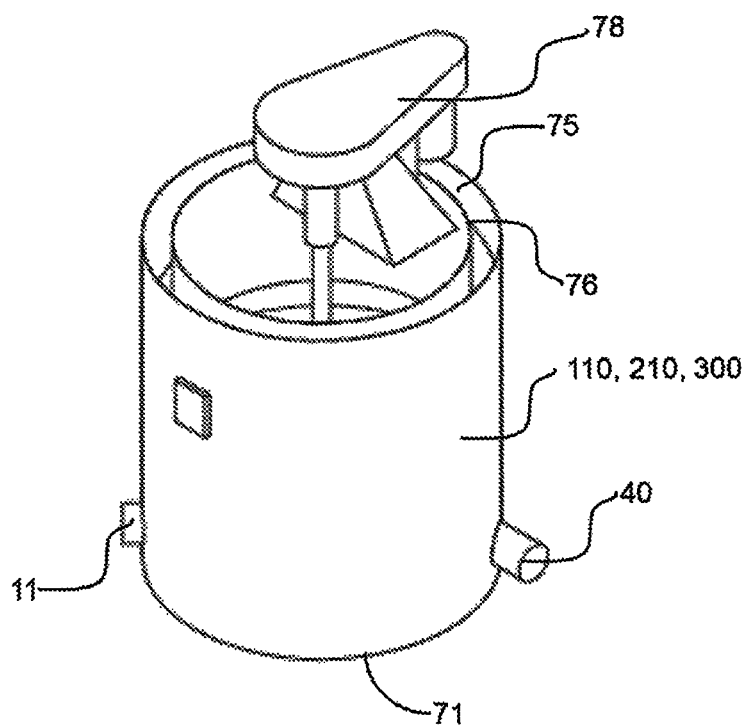
FIG. 15 is a simplified schematic perspective projection of a flotation tank.

The enclosed FIGS. 1a-13c illustrate a flotation arrangement 1, and FIGS. 14a-b illustrate a flotation plant 9 in a schematic manner. In FIG. 15, a flotation cell is presented in some detail. The figures are not drawn to proportion, and many of the components of the flotation cell, the flotation arrangement 1 and the flotation plant 9 are omitted for clarity. The forward direction of flow of slurry is shown in the figures by arrows.

Although flotation is disclosed in the following examples by reference mostly to froth flotation, it should be noted that the principles according to the invention can be implemented regardless of the specific type of the flotation, i.e. the flotation technique can be any of the known per se flotation techniques, such as froth flotation, dissolved air flotation or induced gas flotation.

The basic operational principle of the flotation arrangement 1 is presented in FIGS. 1a-e and 2a-d. The following description is to be read mainly in relation to those figures unless otherwise stated.

A first primary flotation cell 110a of a primary flotation line 10 receives a flow of suspension, that is, a slurry inflow 11 comprising ore particles, water and, in some instances, flotation chemicals such as collector chemicals and non-collector flotation reagents for separating the slurry into an underflow 40 and an overflow 51a. A typical flotation cell 110, 210, 300 is presented in FIG. 15. The flotation cell may comprise a mixer 78 in the form of a mechanical agitator as is shown in FIG. 15, or any other suitable mixer for promoting the collisions between flotation gas bubbles and ore particles. In an embodiment, flotation gas may be fed or introduced into the flotation cell where the slurry is separated into overflow and underflow. In an embodiment, flotation gas may be fed into a part of the flotation cell into which a mixer is arranged, i.e. into a preparation flotation cell preceding a flotation cell in which the ore particles are floated and thus separated into overflow and underflow.

In a flotation process where conventional flotation with flotation chemicals is employed, a similar process of froth flotation takes place: the collector chemical molecules adhere to surface areas on ore particles having the valuable mineral, through an adsorption process. The valuable mineral acts as the adsorbent while the collector chemical acts as the adsorbate. The collector chemical molecules form a film on the valuable mineral areas on the surface of the ore particle. The collector chemical molecules have a non-polar part and a polar part. The polar parts of the collector molecules adsorb to the surface areas of ore particles having the valuable minerals. The non-polar parts are hydrophobic and are thus repelled from water. The repelling causes the hydrophobic tails of the collector molecules to adhere to flotation gas bubbles. An example of a flotation gas is atmosphere air pumped to flotation cell. A sufficient amount of adsorbed collector molecules on sufficiently large valuable mineral surface areas on an ore particle may cause the ore particle to become attached to a flotation gas bubble. It is also conceivable that the flotation process may be performed without flotation chemicals. It is also possible to perform the flotation process as reverse flotation. In the following, most of the examples are disclosed in view of conventional flotation, unless stated that the examples specifically relate to reverse flotation. All of the embodiments and examples given may, however, be realized in a reverse flotation process as well.

Ore particles become attached or adhered to gas bubbles to form gas bubble-ore particle agglomerates. These agglomerates rise to the surface of the flotation cells 110a-b, 210a-b at the uppermost part of the cell by buoyancy of the gas bubbles, as well as with the continuous upwards flow of slurry which may be induced by both mechanical agitation and the infeed of slurry into the cell 110a-b, 210a-b.

The gas bubbles may form a layer of froth. Froth gathered to a surface of slurry in the flotation cell 110a-b, 210a-b, comprising the gas bubble-ore particle agglomerates is let to flow out of flotation cell 110a-b, 210a-b, over a launder lip 76 and into a launder 75. It is also conceivable that the flotation cells are used as so-called overflow flotation cells where no continuous coherent layer of froth is formed on the slurry surface but actual slurry comprising ore particles with valuable minerals floated in the flotation cell is driven over the launder lip 76.

From the surface of the slurry at the top part of the primary flotation cell 110a, 110b, the valuable mineral containing ore particles overflow the launder lip 76 of the flotation cell to be collected into the launder 75. In the case of reverse flotation, naturally, the ore particles not containing valuable mineral are collected into the overflow, while the ore particles containing the valuable mineral become recovered via an underflow.

This fraction of the slurry is called primary overflow 51a, 51b. From a secondary flotation cell 210a, 210b, overflow 50 is collected in the same way. By a launder lip 76 is herein meant the peripheral edge of a flotation cell 110a-b, 210a-b at the upper part of the cell over which froth overflow with valuable material particles flows to the launder 75.

The overflow 50 from secondary flotation lines 21, 22 is recovered as a first concentrate 81. The first concentrate 81 of ore particles comprising valuable mineral is in a form of a fluid which is led to further flotation lines or stages according to embodiments of the invention, or to other further treatment according to solutions known in the art.

From the area located close to a flotation cell bottom 71, a gangue or a part of the slurry containing ore particles that do not rise onto the surface of the slurry is led out of the primary flotation cell 110a as underflow 40. Underflow 40 is led into a subsequent primary flotation cell 110b that receives underflow 40 as an infeed from the previous primary flotation cell 110a. The slurry is treated in the subsequent primary flotation cell 110b similarly as in the first primary flotation cell 110a, in a manner well known to a person skilled in the art.

The primary flotation line 10 may comprise at least three primary flotation cells 110a-c (FIGS. 3a-c, 4a-c). Alternatively, the primary flotation line 10 may comprise 3-10 primary flotation cells 110 (in FIGS. 5a-10c and 12 embodiments are presented where there are five primary flotation cells 110a-e, and in FIGS. 11a-c an embodiment with six primary flotation cells 110a-f is presented). Alternatively, the primary flotation line 10 may comprise 4-7 primary flotation cells 110a-g. Embodiments of the invention, comprising different numbers of primary flotation cells in the primary flotation line 10 are introduced in the "Examples" section of this disclosure.

The two primary flotation cells 110a, 110b are connected in series. The fluid connection may be realized by a conduit 500 (pipe or tube, as is shown in the figures) so that the subsequent primary flotation cells are arranged at a distance from each other. Alternatively, the two primary flotation cells 110a, 110b may be arranged into direct cell connection so that no separate conduit between the two flotation cells 110a, 110b is needed (not shown in figures). In embodiments of the invention, where the primary flotation line 10 comprises more than two primary flotation cells 110a-f, all of the adjacent or subsequent flotation cells of the flotation line may be arranged into fluid connection with conduits 500 arranged between the flotation cells for directing an underflow 40 from one flotation cell to the next flotation cell. Alternatively, all of the flotation cells 110a-f may be arranged into direct cell connection with the neighbouring flotation cells. Alternatively, some of the adjoining flotation cells 110a-f may arranged in direct cell connection with the neighbouring flotation cells, while other neighbouring flotation cells may have a conduit 500 for realizing the fluid connection. The arrangement and design of the primary flotation line 10 may depend on the overall process requirements and physical location of the flotation arrangement 1.

Further, the secondary flotation cell 210a of the first secondary flotation line 21, as well as the secondary flotation cell 210b of the further secondary flotation line 22 may be arranged in direct fluid connection with the first primary flotation cell 110a, 110b from which the secondary flotation cell 210a, 210b receive the overflow 51a, 51b, i.e. there are no further processing steps such as a grinding step or a conditioning step arranged between the primary flotation line 10 and the secondary flotation lines 21, 22.

From the last primary flotation cell 110b of the flotation line 10, the underflow 40' (which may be reject in normal flotation, or accept in reverse flotation) is led out of the flotation arrangement 1 as a tailings flow 83 which may be further treated in any suitable manner known in the art.

The first primary flotation cell 110a of the primary flotation line 10 is at least 100 m3 in volume. Alternatively, the first primary flotation cell 100a may be at least 500 m3 in volume. Alternatively, the first primary flotation cell 110a may be at least 1000 m3 in volume.

The second primary flotation cell 110b, or any one of the subsequent primary flotation cells 110b-f downstream of the first primary flotation cell 100a, is at least 100 m3 in volume. Alternatively, the second primary cell 110b, or any one of the subsequent primary flotation cells 110b-f downstream of the first primary flotation cell 100a, may be at least 300 m3 in volume. Alternatively, the second primary cell 110b, or any one of the subsequent primary flotation cells 110b-f downstream of the first primary flotation cell 100a, may be at least 500 m3 in volume.

In embodiments of the invention, the second primary flotation cell 110b, some of the second primary flotation cells 110b-f, or all of the second primary flotation cells 110b-f, may be equal in volume as the first primary flotation cell 110a. In embodiments of the invention, the second primary flotation cell 110b, some of the second primary flotation cells 110b-f, or all of the second primary flotation cells 110b-f, may be smaller in volume than the first primary flotation cell 110a (see FIGS. 10a-c).

The primary overflow 51a from the first primary flotation cell 110a is directed to a first secondary flotation line 21. The first secondary flotation cell comprises at least one secondary flotation cell 210a in direct fluid communication with at least one first primary flotation cell 110a. The first secondary flotation cell 210a is arranged to receive primary overflow 51a of the at least one first primary flotation cell 110a as inflow, for the recovery of a first concentrate 81 comprising ore particles with valuable mineral or minerals. The first secondary flotation cell 210a, as well as any other secondary flotation cell, operates on standard flotation principles, as described earlier in this disclosure. An overflow 50 of the first secondary flotation cell is collected as the first concentrate 81, which may then be led to any suitable further processing step known in the art.

The first secondary flotation line 21 may comprise more than one secondary flotation cells 210a. An overflow 50 from the first secondary flotation cell 210a may be directed into a further secondary flotation cell in the first secondary flotation line 21 (this embodiment is not shown in the figures), and from that further secondary flotation cell into the next one in the first secondary flotation line 21, should there be more than two cells in fluid connection to form the flotation line. The first secondary flotation line 21 may comprise 1-4 secondary flotation cells in fluid communication. In an embodiment, the first secondary flotation line 21 may comprise two secondary flotation cells 210a. In another embodiment, the first secondary flotation line 21 may comprise three secondary flotation cells 210a (not shown in the figures).

The subsequent secondary flotation cells 210a of a first secondary flotation line 21 may be arranged in direct cell connection with each other, or they may be arranged in fluid connection with each other via a conduit or conduits 500. In an embodiment, all of the adjoining secondary flotation cells 210a of a first secondary flotation line 21 may be arranged in direct cell connection with each other; alternatively, all of the adjoining secondary flotation cells 210a may be arranged in fluid connection via conduits 500; alternatively, some of the adjoining secondary flotation cells 210a may be arranged in direct cell connection, while other may be arranged to have a conduit 500 between them, similarly to what has been described in connection with the primary flotation line 10.

In an embodiment as depicted in FIG. 1a, underflow 42a from the first secondary flotation line 21 is arranged to flow to the primary flotation cell 110a from which the primary overflow 51a was received. In an embodiment, the underflow 42a may be arranged to flow to a primary flotation cell 110b downstream of the primary flotation cell 110a from which the primary overflow 51a was received (see FIGS. 3a-c). The underflow 42a may be arranged to flow directly into the primary flotation cell 110a, or into the conduit 500 (not shown in the figures) preceding the primary flotation cell 110a.

The underflow 42a is to be understood to mean an underflow 42a from the last of the secondary flotation cells of the first secondary flotation line 21. Therefore, herein by underflow 42a is meant interchangeably either the underflow of a single secondary flotation cell 210a of a first secondary flotation line 21, or the underflow of the entire first secondary flotation line 21, as directed from the last of the secondary flotation cells 210a of the first secondary flotation line 21 into further treatment in the primary line 10.

The secondary flotation cell 210a of the first secondary flotation line 21 in fluid communication with a primary flotation cell 110a is 100-1000 m3 in volume. Alternatively, the secondary flotation cell 210a of the first secondary flotation line 21 in fluid communication with a primary flotation cell 110a is 400-1000 m3 in volume.

The volume of the secondary flotation cell 210a of the first secondary flotation line 21 in fluid communication with at least one primary flotation cell 110a is 2-50% of the aggregate volume of the at least one primary flotation cell 110a. Alternatively, the volume of the secondary flotation cell 210a of the first secondary flotation line 21 in fluid communication with at least one primary flotation cell 110a may be 3-30% of the aggregate volume of the at least one primary flotation cell 110a (see FIGS. 2a-c).

By aggregate volume herein is meant the combined volume of the primary flotation cells 110a from which the secondary flotation cell 110b receives overflow 51a. For example, the further secondary flotation cell 210a may receive overflows 51a from more than one primary flotation cell 110a of the primary line 10. In that case, the aggregate volume is the combined volume of the primary flotation cells 110a.

At least one further secondary flotation line 22 is arranged downstream of the first secondary line 21. The further secondary flotation line 22 comprises at least one secondary flotation cell 210b in direct fluid communication with a further primary flotation cell 110b of the primary flotation line 10. The secondary flotation cell 210b of the further secondary flotation line 22 is arranged to receive primary overflow 51b of the further primary flotation cell 110b. The further secondary flotation cell 210b is arranged to receive primary overflow 51b of the at least one further primary flotation cell 110b as inflow, for the recovery of a first concentrate 81, comprising ore particles with valuable mineral or minerals. The further secondary flotation cell 210b, as well as any other secondary flotation cell, operates on standard flotation principles, as described earlier in this disclosure. An overflow 50 of the secondary flotation cell 210b is collected as the first concentrate 81, which may then be led to any suitable further processing step known in the art.

Figure 9A:
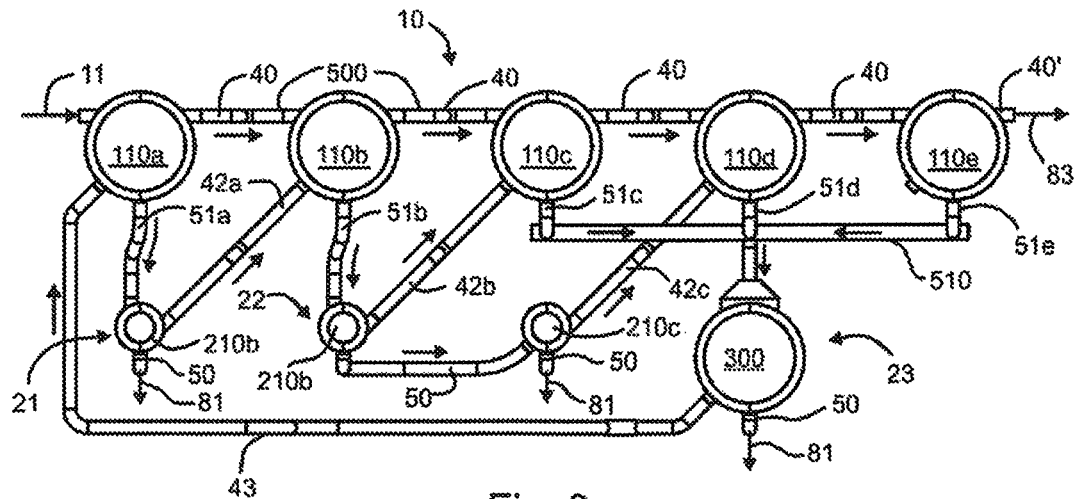
FIG. 9a is a flow chart illustration for an embodiment of the invention.
Figure 9B:
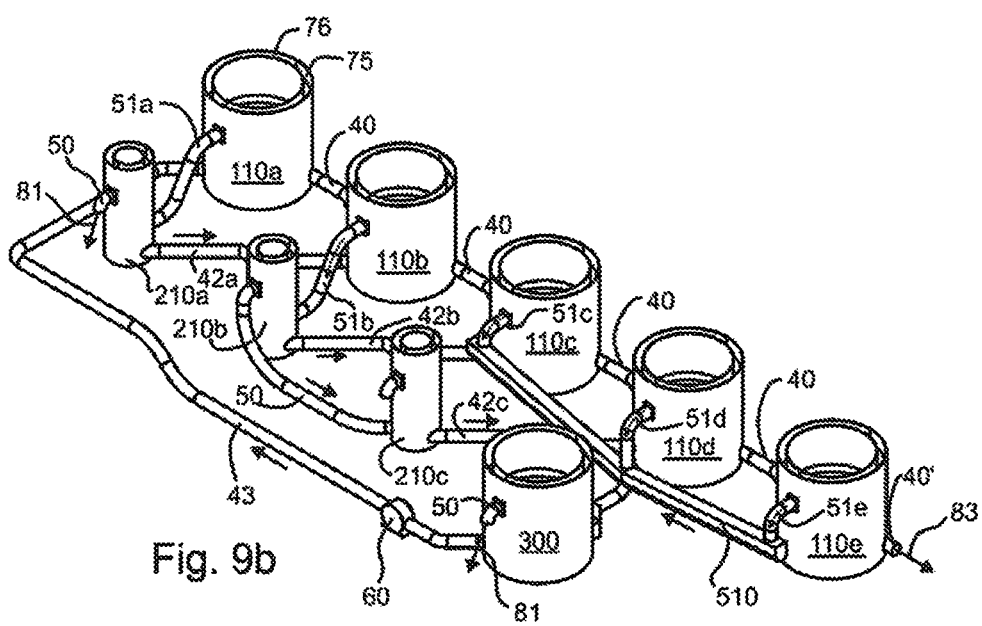

The further secondary flotation line 22 may comprise more than one secondary flotation cells 210b (see FIG. 9a-b). An overflow 50 from the first secondary flotation cell 210b of the further secondary flotation line 22 may be directed into a further secondary flotation cell in the further secondary flotation line 22, and from that further secondary flotation cell into the next one in the further secondary flotation line 22, should there be more than two cells in fluid connection to form the flotation line.

The further secondary flotation line 22 may comprise 1-4 secondary flotation cells in fluid communication. In an embodiment, the further secondary flotation line 22 may comprise two secondary flotation cells 210b. In another embodiment, the further secondary flotation line 22 may comprise three secondary flotation cells 210b (not shown in the figures).

The number of secondary flotation cells 210b in the further secondary flotation line 22 may be equal to the number of secondary flotation cells 210a in the first secondary flotation line 21. In some embodiments, the number of the secondary flotation cells 210b in the further secondary flotation line 22 may be higher than the number of secondary flotation cells 210a in the first secondary flotation line 21.

For example, the first secondary flotation line 21 may have one secondary flotation cell 210a and the further secondary flotation line 22 may have two or three secondary flotation cells 210b. In an embodiment, the first secondary flotation line 21 may have two secondary flotation cells 210a and the further secondary flotation line 22 may have four secondary flotation cells 210b.

The secondary flotation cell 210b of the further secondary flotation line 22 in direct fluid communication with a primary flotation cell, for example primary flotation cell 110b, is 100-1000 m3 in volume. Alternatively, the secondary flotation cell 210b of the further secondary flotation line 22 in direct fluid communication with a primary flotation cell, for example primary flotation cell 110b, is 300-1000 m3 in volume.

The volume of the secondary flotation cell 210b of the further secondary flotation line 22 in fluid communication with at least one primary flotation cell 110b is 2-50% of the aggregate volume of the at least one primary flotation cell 110b. Alternatively, the volume of the secondary flotation cell 210b of the further secondary flotation line 22 in fluid communication with at least one primary flotation cell 110b is 3-30% of the aggregate volume of the at least one primary flotation cell 110b (see FIGS. 2a-d).

By aggregate volume herein is meant the combined volume of the primary flotation cells 110 from which the secondary flotation cell 110b receives overflow 51. For example, the further secondary flotation cell 210b may receive overflows 51b, 51c from primary flotation cells 110b, 110c of the primary line 10 (see FIGS. 11a-c). In that case, the aggregate volume is the combined volume of the primary flotation cells 110b, 110c.

Figure 11A:
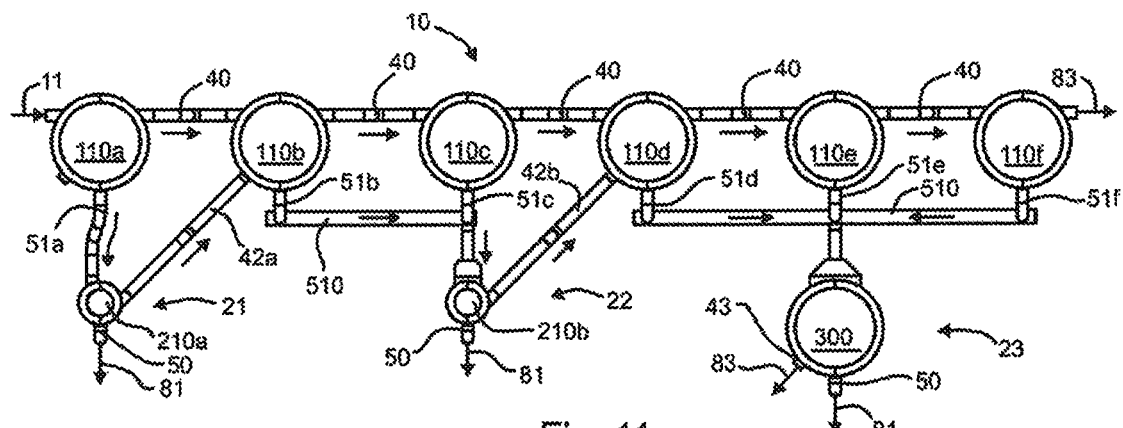
FIG. 11a is a flow chart illustration for an embodiment of the invention.

The further secondary flotation line 22 may be arranged to receive primary overflow 51b-d from 1-4 primary flotation cells 110b-d. In an embodiment, the further secondary flotation line 22 may be arranged to receive primary overflow 51b-d from 1-2 primary floatation cells 110b-c. An embodiment where the further secondary flotation line 22 receives primary overflow 51b, 51c from two secondary flotation cells 110b, 110c is depicted in FIGS. 11a and b. An embodiment where the further secondary flotation line 22 receives primary overflow 51b from one secondary flotation cell 110b is depicted for example in FIGS. 1a and 1b.

In an embodiment, the first secondary flotation cell 210a of the first secondary flotation line 21 has a larger volume than the first secondary flotation cell 210b of a further secondary line 22.

The subsequent further secondary flotation cells 210b of a further secondary flotation line 22 may be arranged in direct cell connection with each other, or they may be arranged in fluid connection with each other via a conduit or conduits 500. In an embodiment, all of the adjoining secondary flotation cells 210b of a further secondary flotation line 22 may be arranged in direct cell connection with each other; alternatively, all of the adjoining secondary flotation cells 210b may be arranged in fluid connection via conduits 500; alternatively, some of the adjoining secondary flotation cells 210b may be arranged in direct cell connection, while other may be arranged to have a conduit 500 between them, similarly to what has been described in connection with the primary flotation line 10 and the first secondary flotation line 21.

In an embodiment as depicted in FIG. 1a, underflow 42b from the further secondary flotation line 22 is arranged to flow to the further primary flotation cell 110b from which the primary overflow 51b was received. In an embodiment, the underflow 42b may be arranged to flow out of the further secondary flotation line 22 as a tailings flow 83 (FIG. 1b). In an embodiment, the underflow 42b may be arranged to flow to a primary flotation cell 110c downstream of the primary flotation cell 110b from which the primary overflow 51b was received (see FIGS. 3a-c). The underflow 42b may be arranged to flow directly into the primary flotation cell 110b, 110c, or into the conduit 500 preceding the primary flotation cell 110b, 110c.

The underflow 42b is to be understood to mean a underflow 42b from the last of the secondary flotation cells of the further secondary flotation line 22. Therefore, herein by underflow 42b is meant interchangeably either the underflow of a single further secondary flotation cell 210b of a further secondary flotation line 22, or the underflow of the entire first secondary flotation line 22 as directed from the last of the secondary flotation cells 210b of the further secondary flotation line 22 into further treatment in the primary line 10.

The flows of slurry (overflow, underflow) between the different flotation cells (primary flotation cells, secondary flotation cells) may be arranged in any suitable fashion depending on the flotation process requirements and physical characteristics of the site into which the flotation arrangement is established. In the following, some examples of possible embodiments are given. The list is non-exhaustive, and it is obvious to a person skilled in the art that other combinations are possible within scope of the invention. Different embodiments may be combined in order to obtain suitable arrangements.

In an embodiment (FIGS. 9a, 9b), the underflow 42c from a second secondary flotation cell 210c of a secondary flotation line 22 may be arranged to flow to a primary flotation cell 110d downstream from the primary flotation cell from which the primary overflow 51a, 51b was received. In that case, there may also be one primary flotation cell 110 between the last flotation cell 110a from which the primary overflow 51a was received, and the primary flotation cell 110b to which the underflow 42b from the second secondary flotation cell is arranged to flow.

In an embodiment, the underflow 42b from the first secondary flotation cell 210b of a further secondary line 22 may be arranged to flow to a primary flotation cell 110c downstream of the last primary flotation cell 110b from which the primary overflow 51b to the secondary line 22 was received (see FIG. 9a).

According to an embodiment of the invention, underflow 42a, 42b from each secondary flotation cell 210a, 210b in direct fluid communication with a primary flotation cell 110a, 110b may be arranged to flow to a downstream primary flotation line 10.

In an embodiment, primary overflow 51a from a primary flotation cell 110a may be arranged to flow into two parallel secondary flotation cells 210a. This embodiment is not shown in the figures. Such embodiment could easily be conceivable for example into the embodiment presented in FIG. 3a by arranging a second secondary flotation cell 210a next to or in the vicinity of the single secondary flotation tank 210a in the first secondary flotation line 21, and directing the overflow 51a via a collecting conduit into the two parallel secondary flotation cells. A first concentration 81 as overflow 50 from both of the two parallel secondary flotation cells 210a would be separately collected and directed further, while the underflows 42a from both of the two parallel secondary flotation cells 210a could be collected and directed downstream back into the primary line via a collecting conduit 510 similar to that shown in for example FIG. 5a.

According to an embodiment of the invention, the flotation arrangement 1 may comprise two primary flotation lines 10*a*, 10*b*. The first secondary line 21 may receive overflow 51*a*, 52*a* from the first primary flotation cells 110*a*, 120*a* of both primary lines 10*a*, 10*b* (see FIG. 12). In an embodiment, there may also be a further secondary line 22 that may receive overflow 51*b*, 52*b* from the second primary flotation cells 110*b*, 120*b* of both primary flotation lines 10*a*, 10*b*.

Flows of slurry, in particular the underflows 40, 42*a-d* may be arranged to be driven by gravity. In that case, at least some of the flotation cells 110*a-f*, 210*a-d* may be arranged in a stepwise fashion in relation to the ground level on which the flotation arrangement is established. Alternatively, the launder lips 76 of the flotation cells, for example primary flotation cells 110*a-c*, may be arranged at different heights (see FIG. 14*b*).

As can be seen in FIG. 1*e*, a step realised in between any adjacent flotation cell causes a difference in the slurry surface level 70 of the two adjacent flotation cells. In this instance, the step is arranged between the two primary flotation cells of the primary flotation line 10. It is equally conceivable that the step may be arranged between a primary flotation cell of a primary flotation line and the at least one secondary flotation cell of a first secondary flotation line or a further secondary flotation line; or between the adjacent secondary flotation cells of a secondary flotation line. It is obvious to a person skilled in the art that the vertical positioning of the different flotation cells may be realized in the best possible manner taking into account the requirements of the flotation process and the construction location of the flotation arrangement 1.

The gravitational flow of slurry is achieved by the hydraulic gradient between any two flotation cells with different slurry surface levels, realized with a step between the flotation cell bottoms 71, as can be seen in FIGS. 1*e*, 3*c*, 4*c*, 5*c*, 6*c*, 7*c*, 8*c*, 9*c*, 10*c* and 11*c*, or with a step between the launder lip heights, as can be seen in FIG. 14, and as has been explained earlier in the summary part of this disclosure.

Alternatively, the flows of slurry may be driven by one or more low-head pumps arranged between any two adjoining flotation cells, either into the conduit or conduits 500, as can be seen in FIG. 1*c*, or directly between the adjoining flotation cells in case the adjoining cells are arranged in direct cell connection with each other. Pumping may be required when the flotation cells or some of the flotation cells are arranged in an uniplanar fashion, i.e. having the bottoms of the cells 70 at a single level in relation to the ground level (see for example FIGS. 1*d*, 2*c-d*), whereby the slurry surface level of two adjoining flotation cells may be more or less the same and now hydraulic gradient is created, at least not sufficiently to drive the flow of slurry by gravity.

In an embodiment, the flows of slurry may be driven by gravity between some of the adjoining flotation cells, and by low-head pump or pumps 60 between some of the adjoining flotation cells in the flotation arrangement 1.

In an embodiment, the flow of slurry to and/or away from a secondary flotation cell 210*a* may be driven by gravity. In an embodiment, the flow of slurry to and/or from two secondary flotation cells 210*a*, 210*b* may be driven by gravity (see FIGS. 2*b*, 4*b*). In an embodiment, the flow of slurry to and/or away from a secondary flotation cell 210*a* may be driven by one or more low-head pumps 60. In an embodiment, the flow of slurry to and/or from two secondary flotation cells 210*a*, 210*b* may be driven by one or more low-head pumps 60. In an embodiment, the flow of slurry to and/or from a secondary flotation cell 210*a* may be driven by gravity and by one or more low-head pumps 60. In an embodiment, the flow of slurry to and/or from two secondary flotation cells 210*a*, 210*b* may be driven by gravity and by two or more low-head pumps 60 (see for example FIG. 2*b*).

In an embodiment, primary overflow 51*a* from a primary flotation cell 110*a* may be driven by gravity. In an embodiment, primary overflow 51*a*, 51*b* from at least two primary flotation cells 110*a*, 110*b* may be driven by gravity.

In an embodiment, overflow 50 from a secondary flotation cell 210*a* may be driven by gravity. In an embodiment, overflow 50 from at least two secondary flotation cells 210*a*, 210*b* may be driven by gravity.

In an embodiment, overflow 50 from each secondary flotation cell 210*a*, 210*b* may be driven by gravity.

In an embodiment, underflow 40 from a primary flotation cell 110*a* may be driven by gravity. In an embodiment, underflow 40 from at least two primary flotation cells may be driven by gravity.

In an embodiment, underflow 42*a* from a secondary flotation cell 210*a* may be driven by gravity. In an embodiment, underflow 42*a*, 42*b* from at least two secondary flotation cells 210*a*, 210*b* may be driven by gravity.

In an embodiment, underflow 40 from each primary flotation cell 110*a-f* may be driven by gravity.

In an embodiment, underflow 42*a*, 42*b* from each secondary flotation cell 210*a*, 210*b* may be driven by gravity.

In an embodiment, primary overflow 51*a* from a primary flotation cell 110*a* may be driven by a low-head pump 60. In an embodiment, primary overflows 51*a*, 51*b* from at least two primary flotation cells 110*a*, 110*b* may be driven by low-head pumps 60.

In an embodiment, overflow 50 from a secondary flotation cell may be driven by a low-head pump 60. In an embodiment, overflow 50 from at least two secondary flotation cells 210*a*, 210*b* may be driven by a low-head pump 60.

According to an embodiment of the invention, overflow 50 from each secondary flotation cell 210*a*, 210*b* may be driven by a low-head pump 60.

In an embodiment, underflow 40 from a primary flotation cell 110*a* may be driven by a low-head pump 60. In an embodiment, underflow 40 from at least two primary flotation cells 110*a*, 110*b* may be driven by a low-head pump 60.

In an embodiment, underflow 42*a* from a secondary flotation cell 210*a* may be driven by a low-head pump 60. In an embodiment, underflow 42*a*, 42*b* from at least two secondary flotation cells 210*a*, 210*b* may be driven by a low-head pump 60.

In an embodiment, underflow 40 from each primary flotation cell 110*a-f* may be driven by a low-head pump 60.

In an embodiment, underflow 42*a*, 42*b* from each secondary flotation cell 210*a*, 210*b* may be driven by a low-head pump 60.

According to an embodiment of the invention, the underflow 40 between two primary flotation cells 110*a*, 110*b* may be driven by gravity, overflow 51*a*, 51*b* from the two primary flotation cells 110*a*, 110*b* may be arranged to flow to different secondary lines 21, 22, and the slurry surface level 70 in the primary flotation cells 110*a*, 110*b* may be different.

The flotation arrangement 1 may also comprise a further processing step 62. The overflow 51*c* of at least one primary flotation cell 110*c*, into which the underflow 42*b* from a further secondary flotation line 22 is directed, may be directed to flow into this further processing step 62. In an embodiment, a combined overflow of the at least one primary flotation cell 110*c* into which the underflow 42*b* from a further secondary flotation line 22 is directed, and of at least one primary flotation cell 110d downstream from the at least one primary flotation cell 110c into which the underflow 42b from a further secondary flotation line 22 is directed, may be directed to flow into the further processing step 62. In FIGS. 14a and 14b, a flotation arrangement 10b is shown, where the overflows 51c, 51d, 51e of the above-described primary flotation cells 110c, 110d, 110e are combined and led into the further processing step 62 via a collecting conduit 500. The further processing step may comprise a grinding step.

Figure 5A:
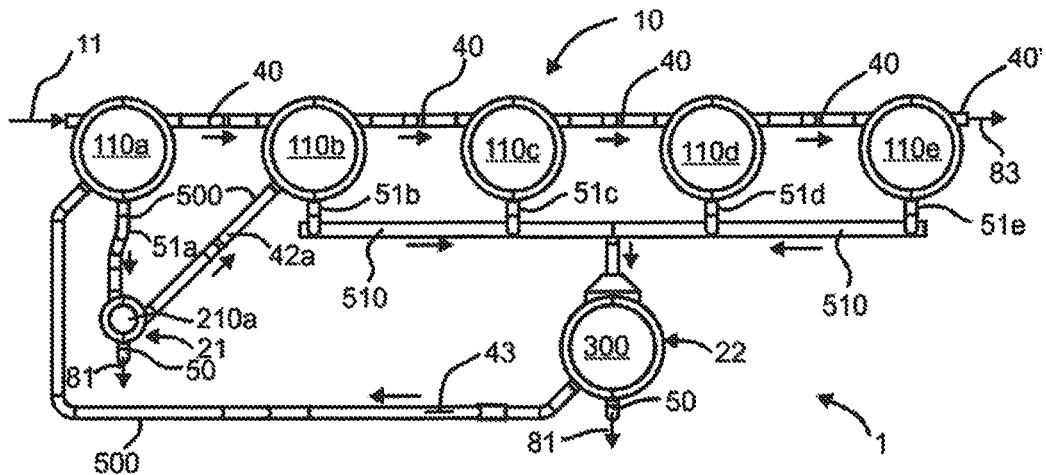
FIG. 5a is a flow chart illustration for an embodiment of the invention.
Figure 5B:
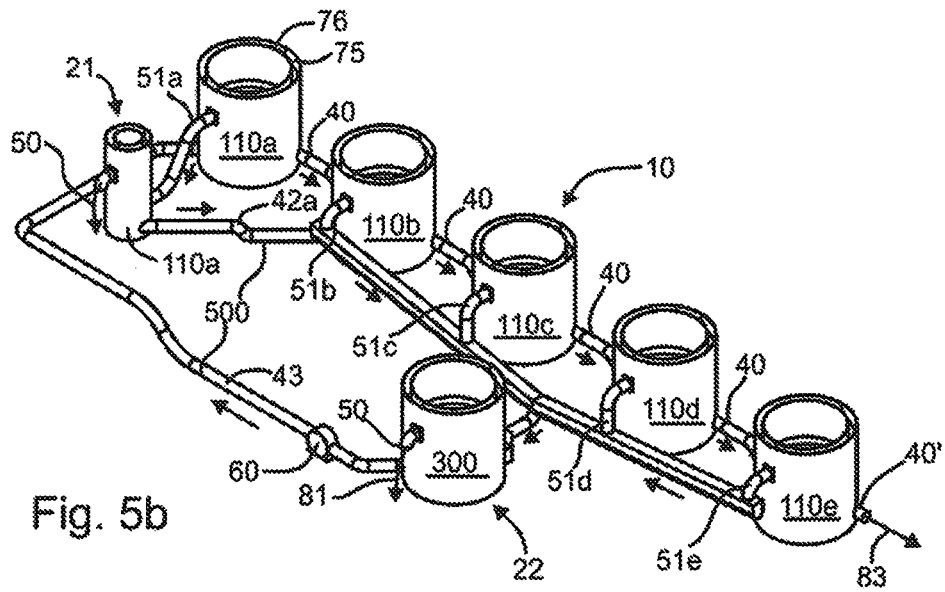
Figure 5C:
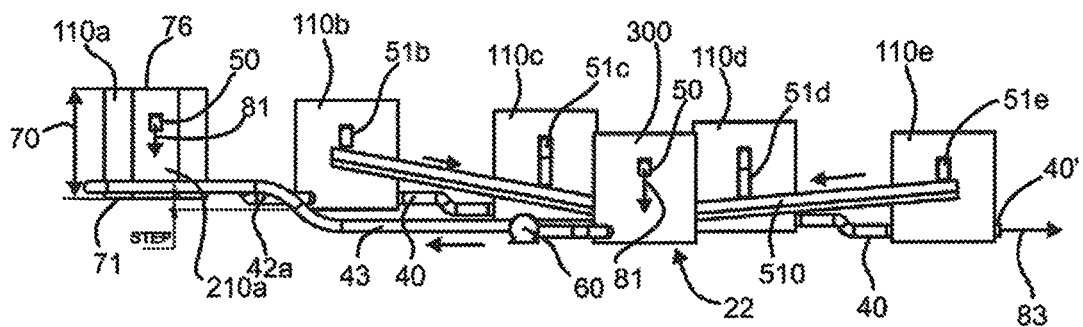

The further processing step may comprise an additional secondary flotation cell 300 in fluid communication with at least one primary flotation cell 110b (see for example FIGS. 5a-c). The additional secondary flotation cell 300 is arranged to receive primary overflow 51b of at least one primary flotation cell 110b. Underflow 43 from the additional secondary flotation cell 300 is arranged to flow to a primary flotation cell 110a upstream of the last of the at least one primary flotation cells 110b from which the primary overflow 51b was received into the additional secondary flotation cell 300. In an embodiment, underflow 43 from the additional secondary flotation cell 300 is arranged to leave the flotation arrangement 1 as tailing flow 83 as is shown for example in FIGS. 10a-c and 11a-c and 14a-b.

In an embodiment, the additional secondary flotation cell 300 may be arranged to receive primary overflow 51b, 51c of at least two primary flotation cells 110b, 110c (this embodiment is not shown in the figures). In an embodiment the conventional cleaner cell 300 may be arranged to receive primary overflow 51c, 51d, 51e of at least three primary flotation cells 110c, 110d, 110e (see FIGS. 7a-c).

In an embodiment, the additional secondary flotation cell 300 may be arranged in a position downstream from the at least one first secondary flotation line 21 and the at least one further secondary floatation line 22 (see for example FIGS. 7a, 8a, 9a, 10a).

The flotation arrangement 1 described herein is particularly suitable for, but not limited to, use in recovering valuable mineral containing ores, where the mineral ore particles comprise copper (Cu), zinc (Zn), iron (Fe), pyrite, or a metal sulfide such as gold sulfide. The flotation arrangement is suitable for use in recovering mineral ore particles comprising a valuable mineral, particularly from low grade ore. The flotation arrangement is particularly suitable for recovering mineral ore particles comprising Cu from low grade ore.

The flotation arrangement 1 as detailed above may be a part of a flotation plant 9 (FIGS. 14a-b). The flotation plant 9 may comprise at least one flotation arrangement 1. In an embodiment, the flotation plant 9 comprises at least two flotation arrangements 1. In an embodiment, the flotation plant comprises at least three flotation arrangements 1.

The flotation plant 9 may comprise a flotation arrangement 1 arranged to recover Cu. Alternatively or additionally, the flotation plant 9 may comprise a flotation arrangement 1 arranged to recover Zn. Alternatively or additionally, the flotation plant 9 may comprise a flotation arrangement 1 arranged to recover pyrite. Alternatively or additionally, the flotation plant 9 may comprise a flotation arrangement 1 arranged to recover a metal from a sulfide, such as gold.

According to an embodiment of the invention, the flotation plant 9 may comprise a flotation arrangement 1 arranged to recover mineral ore particles comprising Cu from low grade ore.

According to an embodiment of the invention, the flotation plant 9 may comprise a flotation arrangement 1 arranged to recover Fe by reverse flotation.

According to an embodiment of the invention, the flotation plant 9 may comprise at least one flotation arrangement 1a for the recovery of a first concentrate 81, and at least one flotation arrangement 1b for the recovery of a second concentrate 82. In an embodiment, the primary flotation cells 110 of the primary line 10a of the at least one flotation arrangement 1a for the recovery of the first concentrate 81 and the primary flotation cells 120 of the primary line 10b of the at least one flotation arrangement 1b for the recovery of the second concentrate 82 are arranged in series (see FIG. 14a-b).

The flotation plant 9 may further comprise an arrangement for further treating the mineral ore particles suspended in slurry so that the second concentrate 82 is different from the first concentrate 81. In an embodiment, the arrangement for further treating the mineral ore particles may be a grinding step 64 disposed between a first flotation arrangement 1a and a second flotation arrangement 1b. In an embodiment, the arrangement for further treating the mineral ore particles may be an arrangement 65 for the addition of flotation chemicals, disposed between a first flotation arrangement 1a and a second flotation arrangement 1b.

In an embodiment, the flotation plant comprises a primary flotation line comprising 10 primary flotation cells. The overflow from the last of the primary flotation cells is arranged to flow into a secondary flotation line comprising an additional secondary flotation cell. The underflow from the additional secondary flotation cell is arranged to flow back into the 1-4 first primary flotation cells of the primary flotation line.

In the flotation method for treating mineral ore particles suspended in slurry according to the present disclosure, the slurry is subjected to at least two stages of primary flotation in series for separating the slurry into a primary underflow 40 and a primary overflow 51a, 51b. The primary underflow 40 from a stage of primary flotation is directed to a subsequent further stage of primary flotation. After a stage of primary flotation, at least one first primary overflow 51a is directed directly to at least one stage of first secondary flotation for the recovery of a first concentrate 81. After a further stage of primary flotation, at least one further primary overflow 51b is directed directly to at least one stage of further secondary flotation for the recovery of the first concentrate 81. The underflow 42a, 42b from a stage of secondary flotation is directed to primary flotation in the last of the at least one stage of primary flotation from which the primary overflow was received. In an embodiment, the underflow 42a, 42b from a stage of secondary flotation may be directed to a downstream stage of primary flotation.

The slurry may be subjected to at least three stages of primary flotation. In an embodiment, the slurry may be subjected to 3-10 stages of primary flotation. In an embodiment, the slurry may be subjected to 4-7 stages of primary flotation.

The at least one primary overflow 51a may be directed to 1-4 stages of first secondary flotation. In an embodiment, the at least one primary overflow 51a may be directed to 1-2 stages of first secondary flotation. In an embodiment, the at least one primary overflow 51a may be subjected to one stage of first secondary flotation.

The at least one further primary overflow 51b may be directed to 1-4 stages of further secondary flotation. In an embodiment, the at least one further primary overflow 51b may be directed to 1-2 stages of further secondary flotation. In an embodiment, the at least one further primary overflow 51b may be directed to one stage of further secondary flotation.

In the flotation method, the flow of slurry may be directed from one stage of flotation (primary or secondary) to a following stage of flotation (primary or secondary) by gravity. In an embodiment, the flow of slurry may be directed from on stage of flotation (primary or secondary) to a following stage of flotation (primary or secondary) by one or more low-head pumps 60. In an embodiment, the flow of slurry may be directed from on stage of flotation (primary or secondary) to a following stage of flotation (primary or secondary) by gravity and by one or more low-head pumps 60.

According to an embodiment of the method, the at least one primary overflow 51b is directed to at least one stage of further processing 62. The stage of further processing may 62 comprise for example a grinding stage or a grinding step. In an embodiment, the stage of further processing comprises a stage of additional secondary flotation. The underflow 43 from the at least one stage of additional secondary flotation is directed to the stage of primary flotation upstream of the last of the at least one stage of primary flotation from which stage the primary overflow 51b was received. In an embodiment, the underflow 43 from at the at least one stage of additional secondary flotation may be directed out of the flotation process, as a tailings flow 83.

In an embodiment, primary overflow 51b, 51c from at least two stages of primary flotation is directed to the stage of additional secondary flotation, or wherein primary overflow from at least three stages of primary flotation is directed to the stage of additional secondary flotation.

The underflow 42b from at least one second stage of secondary flotation may be directed to a last of the stages of primary flotation from which the primary overflow 51b to the second stage of secondary flotation was received. In an embodiment, the underflow 42b from a second stage of secondary flotation may be directed to a stage of primary flotation downstream.

Underflow 42a from at least one stage of first secondary flotation may be directed to a stage of primary flotation downstream of the last stage of primary flotation from which the primary overflow 51a to the stage of first secondary flotation was received.

The underflow from at least one second stage of secondary flotation may be directed to a stage of primary flotation downstream of the last stage of primary flotation from which the primary overflow 51b to the second stage of secondary flotation was received.

The overflow 51a from a stage of primary flotation may be directed to two parallel stages of secondary flotation.

EXAMPLES

In the following, embodiments of the invention are presented in relation to the figures as stated.

Example 1

Figure 2A:
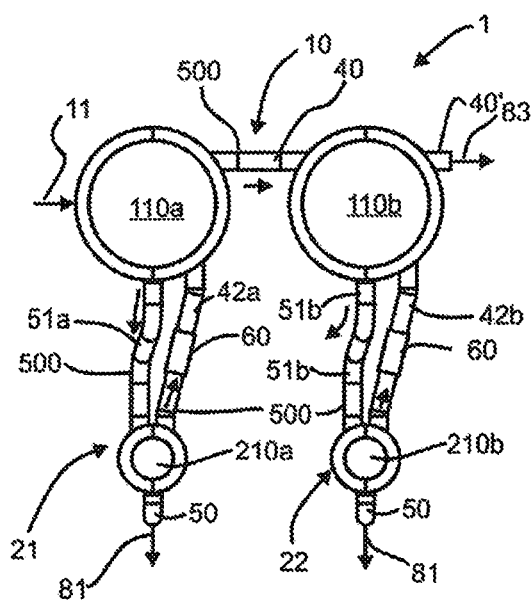
FIG. 2a is a flow chart illustration for an embodiment of the invention.
Figure 2B:
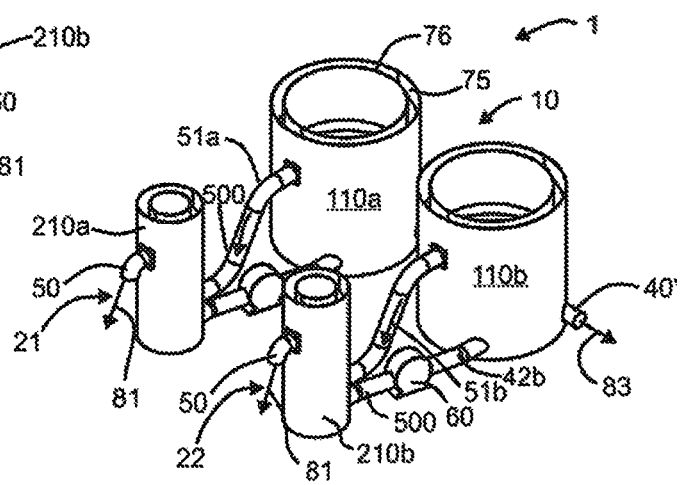
Figure 2C:
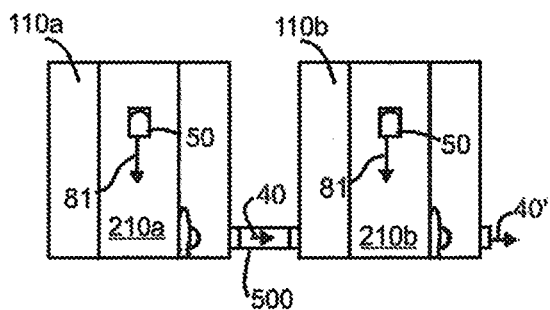
Figure 2D:
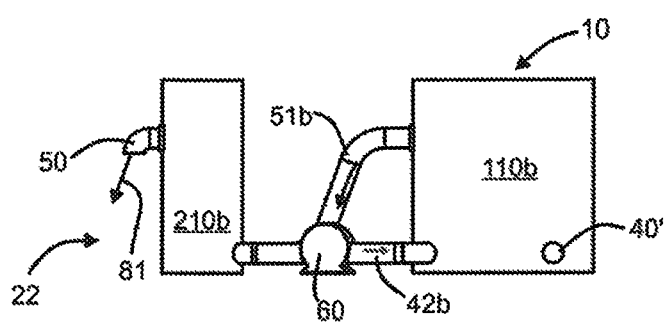
Figure 3A:
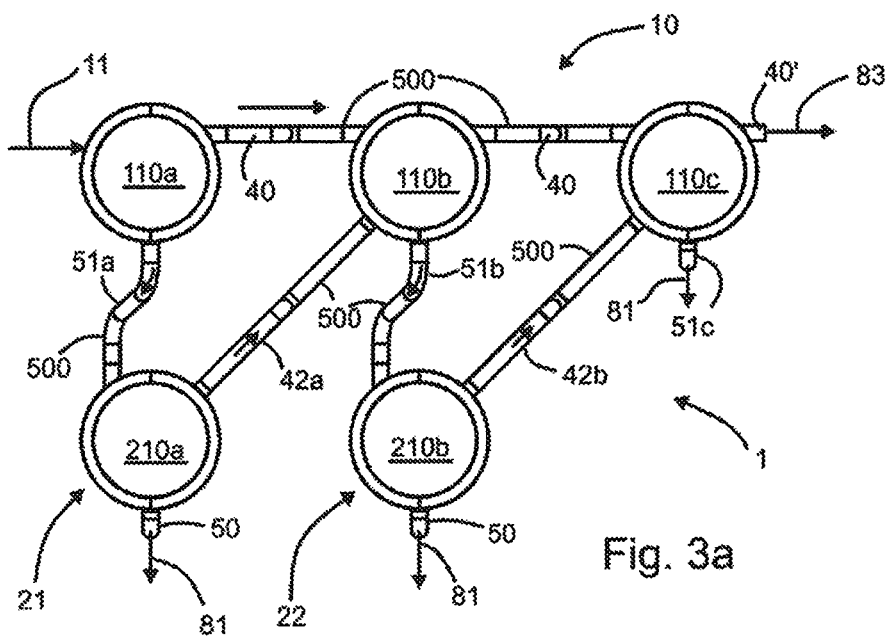
FIG. 3a is a flow chart illustration for an embodiment of the invention.
Figure 3B:
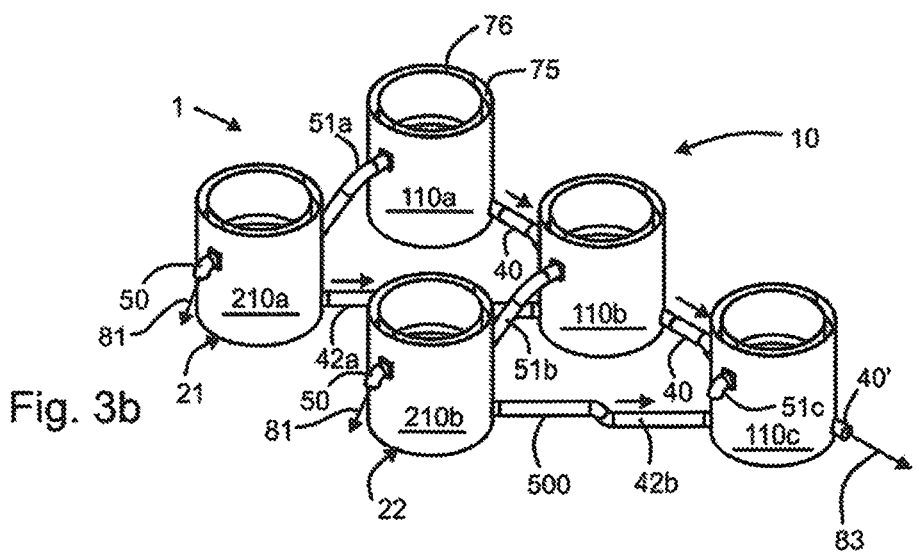
Figure 3C:
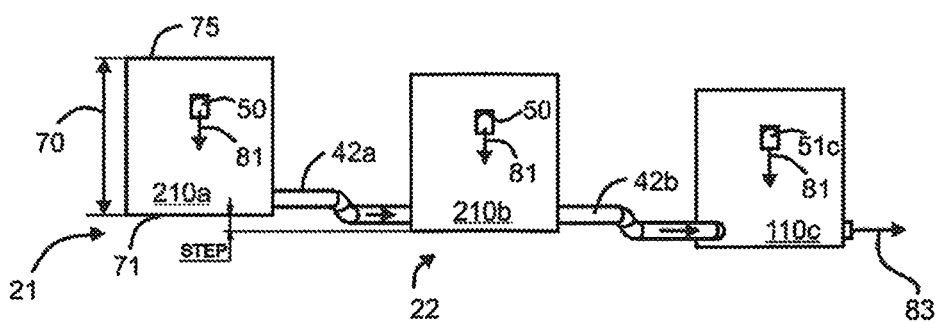

In an embodiment of the invention as presented in FIGS. 3a-c, a slurry inflow 11 is lead into a flotation arrangement 1 comprising a primary flotation line 10 with a first primary flotation cell 110a to be separated into an underflow 40 and an overflow 51a.

Underflow 40, which may comprise an amount of mineral ore particles comprising valuable mineral, from the first primary flotation cell 110a is directed into an adjoining second primary flotation cell 110b, connected in series with the first primary flotation cell 110a, via a conduit 500, to be further separated into an underflow 40 and an overflow 51b.

Underflow 40, which may still comprise an amount of mineral ore particles comprising valuable mineral, from the second primary flotation cell 110b is directed into an adjoining third primary flotation cell 110c, connected in series with the second primary flotation cell 110b, via a conduit 500, to be further separated into an underflow 40 and an overflow 51c.

Underflow 40' is led out of the flotation arrangement 1 as tailings flow 83. The tailings flow 83 comprises flow of slurry from which the ore particles comprising valuable mineral collected as the first concentrate have been by large recovered. This tailings flow 83 may be further led into another flotation arrangement 1 for the recovery of a second concentrate.

Overflow 51c is collected as a first concentrate 81 to be further treated in any suitable manner known in the art. The arrangement thus far is a typical arrangement for conventional froth flotation.

Overflow 51a from the first primary flotation cell 110a is directed into a first secondary flotation line 21 with a secondary flotation cell 210a via a conduit 500 to be separated into an overflow 50 and an underflow 42a in the secondary flotation cell 210a. The overflow 50 is directed out of the first secondary flotation line 21 as a first concentrate 81, to be further treated in any suitable manner. This part of the flotation circuit is similar to any conventional froth flotation arrangement.

However, contrary to a conventional cascading flotation process, the underflow 42a, which may comprise an amount of mineral ore particles comprising valuable mineral, from the first secondary flotation cell 210a is directed into the second primary flotation cell 110b for further treatment in order to recover any remaining mineral ore particles comprising valuable mineral, thus increasing the recovery rate for that mineral within the flotation arrangement 1. This so-called short connection flotation is very advantageous in recovering ore particles comprising valuable mineral from slurries comprising low-grade ores.

Similarly, overflow 51b from the second primary flotation cell 110b is directed into a further secondary flotation line 22 with a secondary flotation cell 210b via a conduit 500 to be separated into an overflow 50 and an underflow 42b in the secondary flotation cell 210b. The overflow 50 is directed out of the further secondary flotation line 22 as a first concentrate 81, to be further treated in any suitable manner. The concentrates 81 from the first secondary flotation line 21, the primary line 10 and the further secondary flotation line 21 may be combined prior to the further treatment.

Underflow 42b, which may still comprise an amount of mineral ore particles comprising valuable mineral, from the further secondary flotation cell 210b is directed into the third primary flotation cell 110c for further treatment in order to recover any remaining mineral ore particles comprising valuable mineral, thus further increasing the recovery rate for that mineral within the flotation arrangement 1.

The primary flotation cells 110a, 110b and 110c are arranged in a stepwise manner so that there is a difference in slurry surface level 70 between each subsequent primary flotation cell 110a, 110b, 110c. In this particular example, as shown in FIG. 3c, each subsequent primary flotation cell 110b, 110c has a bottom 71 arranged on a lower level than the preceding flotation cell 110a, 110b creating a step between the flotation cells. The difference in slurry surface level 70 may, naturally, be realized by arranging the launder lips 76 of each subsequent primary flotation cell 110, 110b, 110c at a different height.

At the same time, a similar step may be arranged between the secondary flotation cells 210a, 210b, as well as between the first primary cell 110a and the secondary flotation cell 210a, and the second primary flotation cell 110b and the secondary flotation cell 210b.

Due to the steps, the slurry surface levels 70 of each subsequent downstream flotation cell is lower than the slurry surface level 70 of the previous flotation cell, which creates a suitable head between the cells to allow the flows of slurry to be driven by gravity. This may lead to savings in energy consumption as no pumping energy is needed. Also the construction of the flotation arrangement may be simplified.

Example 2

Figure 4A:
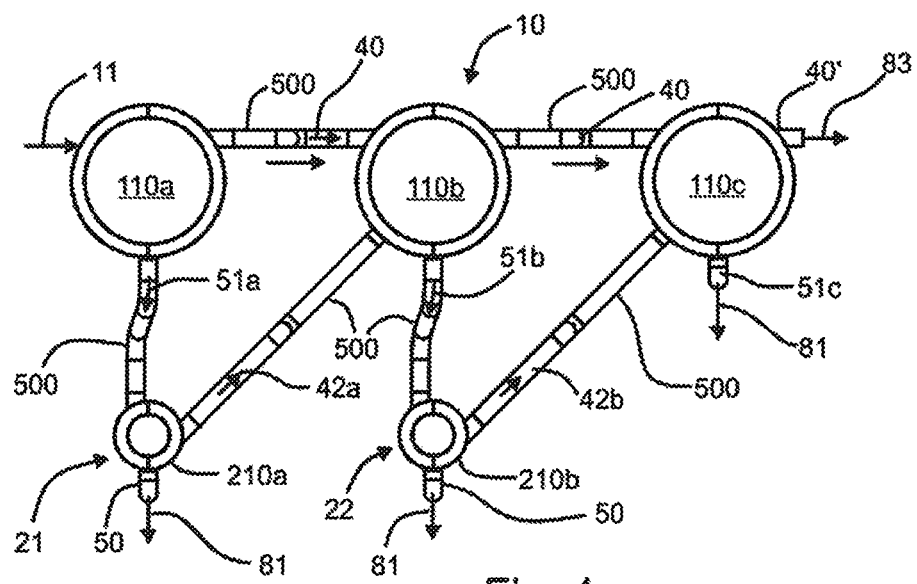
FIG. 4a is a flow chart illustration for an embodiment of the invention.
Figure 4B:
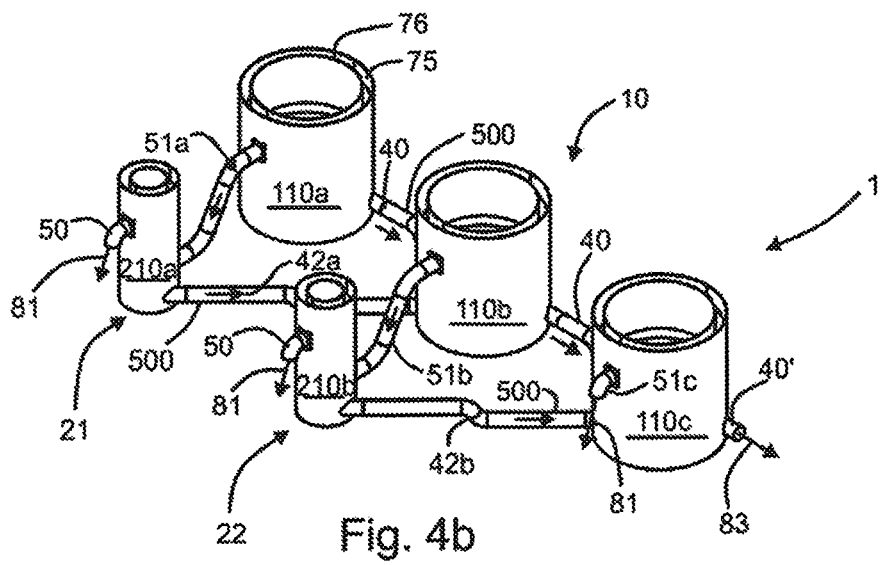
Figure 4C:
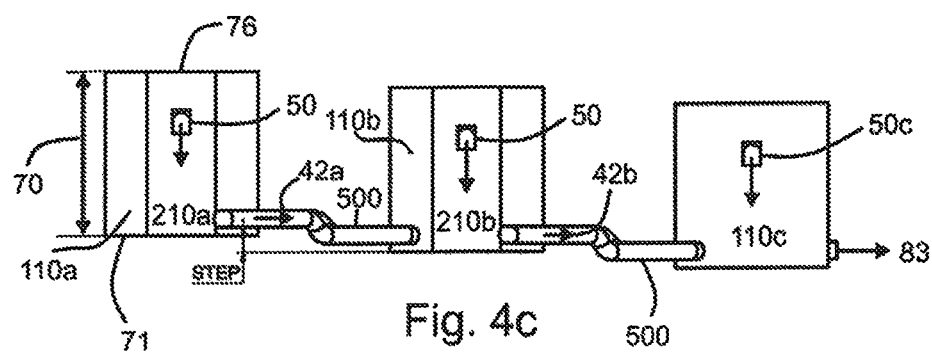

In FIGS. 4a-c is presented another embodiment of the flotation arrangement 1. In the otherwise similar embodiment to the one in Example 1, the secondary flotation cells 210a, 210b are smaller in volume than the primary flotation cells 110a, 110b, 110c.

By using secondary flotation cells smaller in volume than the primary cells from which the secondary cells receive the overflow, the secondary flotation lines 21, 22 may be more efficient in recovering particles which have less valuable mineral in them, i.e. are harder to be led to the surface and froth layer to be recovered into the overflow, thus leading to higher grade concentration 81. This would further increase the recovery rate of the flotation arrangement 1.

Example 3

In one embodiment of the flotation arrangement as depicted in FIGS. 5a-c, a slurry inflow 11 is lead into a flotation arrangement 1, comprising a primary flotation line 10 with a first primary flotation cell 110a, to be separated into an underflow 40 and an overflow 51a.

Underflow 40, which may comprise an amount of mineral ore particles comprising valuable mineral, from the first primary flotation cell 110a is directed into an adjoining second primary flotation cell 110b, connected in series with the first primary flotation cell 110a, via a conduit 500, to be further separated into an underflow 40 and an overflow 51b.

Underflow 40, which may still comprise an amount of mineral ore particles comprising valuable mineral, from the second primary flotation cell 110b is directed into an adjoining third primary flotation cell 110c, connected in series with the second primary flotation cell 110b, via a conduit 500, to be further separated into an underflow 40 and an overflow 51c.

Underflow 40, which may still comprise an amount of mineral ore particles comprising valuable mineral, from the third primary flotation cell 110c is directed into an adjoining fourth primary flotation cell 110d, connected in series with the third primary flotation cell 110c, via a conduit 500, to be further separated into an underflow 40 and an overflow 51d.

Underflow 40, which may still comprise an amount of mineral ore particles comprising valuable mineral, from the fourth primary flotation cell 110d is directed into an adjoining fifth primary flotation cell 110e, connected in series with the fourth primary flotation cell 110d, via a conduit 500, to be further separated into an underflow 40 and an overflow 51e.

Underflow 40' is led out of the flotation arrangement 1 as tailings flow 83. The tailings flow 83 comprises flow of slurry from which the ore particles comprising valuable mineral collected as the first concentrate have been by large recovered. This tailings flow 83 may be further led into another flotation arrangement 1 for the recovery of a second concentrate.

Overflow 51a from the first primary flotation cell 110a is directed into a first secondary flotation line 21 with a secondary flotation cell 210a via a conduit 500 to be separated into an overflow 50 and an underflow 42a in the secondary flotation cell 210a. The secondary flotation cell 210a may be smaller in volume than the first primary flotation cell 210a. The overflow 50 is directed out of the first secondary flotation line 21 as a first concentrate 81, to be further treated in any suitable manner.

The underflow 42a, which may comprise an amount of mineral ore particles comprising valuable mineral, from the first secondary flotation cell 210a is directed into the second primary flotation cell 110b for further treatment in order to recover any remaining mineral ore particles comprising valuable mineral, thus increasing the recovery rate of the flotation arrangement 1 for that mineral within the flotation arrangement 1. The underflow 42a may be led back into the primary line by gravity only, as seen in FIG. 5b, or by a low-head pump 60, which may decrease the energy consumption of the flotation process.

The volume of the secondary flotation cell 210a may be smaller than the volume of the primary flotation cell 110a, as has been described above.

Overflows 51b, 51c, 51d, 51e from the primary flotation cells 110b, 110c, 110d, 110e are first collected into a collecting conduit 510 and directed together as one inflow into a further secondary flotation line 22 with an additional secondary flotation cell 300 to be separated into an overflow 50 and an underflow 43.

The underflow 43 is arranged to flow back upstream to the first primary flotation cell 110a to be once again treated in order to recover any mineral ore particles comprising valuable mineral still present in that flow. The underflow 43 may be first directed into a regrinding step. However, the goal is still the recovery of the first concentrate 81, as the grinding step may be considered as a part of the flotation arrangement 1 for the recovery of a first concentrate 81.

The overflow 50 is directed out of the additional secondary flotation cell 300 as a first concentrate 81, to be further treated in any suitable manner. The concentrates 81 from the first secondary flotation line 21, the primary line 10 and the further secondary flotation line 22 may be combined for further treatment.

The volume of the additional secondary flotation cell is chosen to accommodate the aggregate volume of overflows 51b, 51c, 51d, 51e. It may, however, be smaller in volume than the aggregate volume of the primary flotation cells 110b, 110c, 110d, 110e.

The primary flotation cells 110a, 110b, 110c, 110d and 110e are arranged in a stepwise manner, as described earlier. Similarly, the secondary floatation cell 210a is a step above the primary flotation cell 110b to which the underflow 42a is directed. There is also a step between the additional secondary flotation cell 300 and at least the primary flotation cells 110b, 110c, 110d. Therefore gravity may be used to drive the flows of slurry between these flotation cells. The stepwise manner naturally means that directing the underflow 43 from the additional secondary flotation cell 300 may require one or more low-head pumps 60 to drive the flow of slurry back to the first primary flotation cell 110a.

Example 4

Figure 6A:
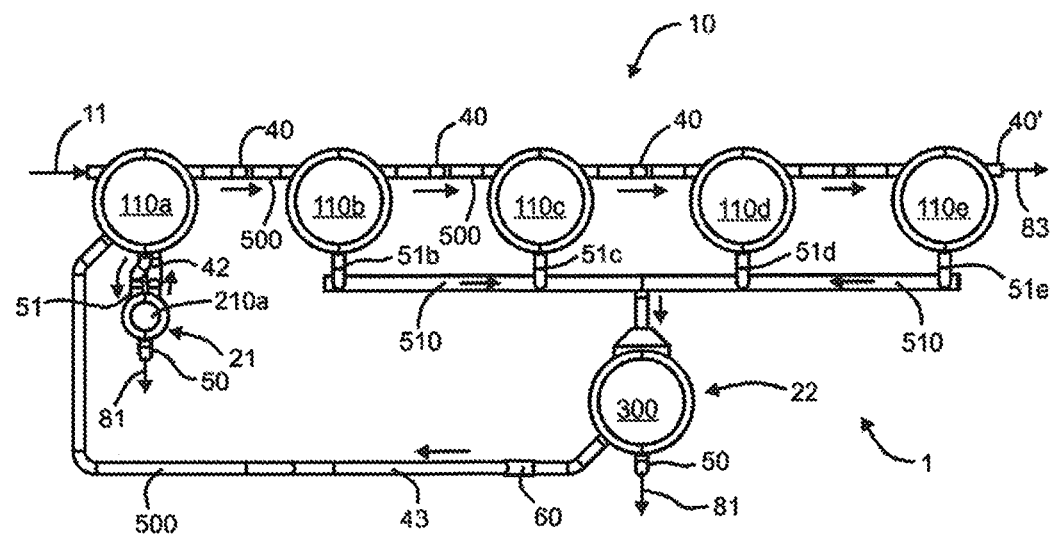
FIG. 6a is a flow chart illustration for an embodiment of the invention.
Figure 6B:
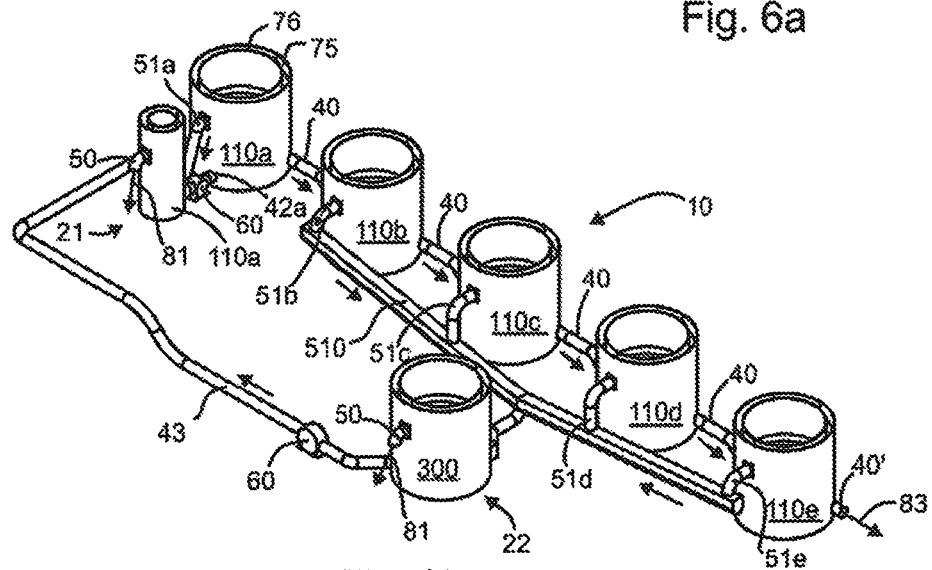
Figure 6C:
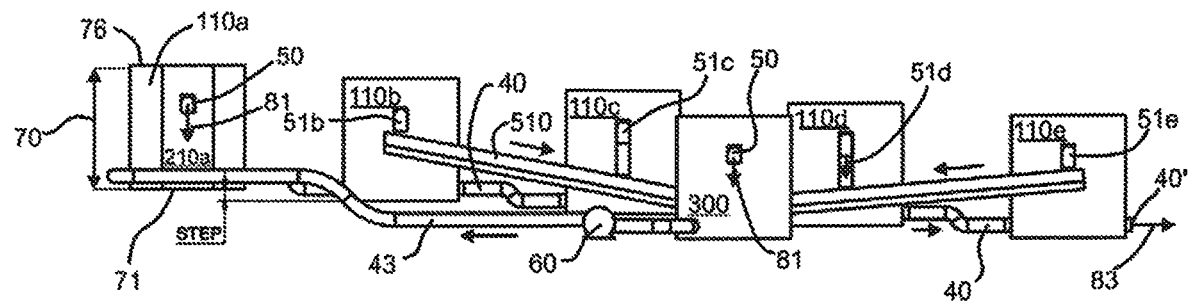

In FIGS. 6a-c, an otherwise similar embodiment to the one in Example 3 is presented. The underflow 42a from the secondary flotation cell 210a is returned back into the primary flotation cell 110a from which the secondary flotation cell 110a received the overflow 51a, creating a short circulation of flotation between the first primary flotation cell 110a and the secondary flotation cell 210a.

Example 5

Figure 7A:
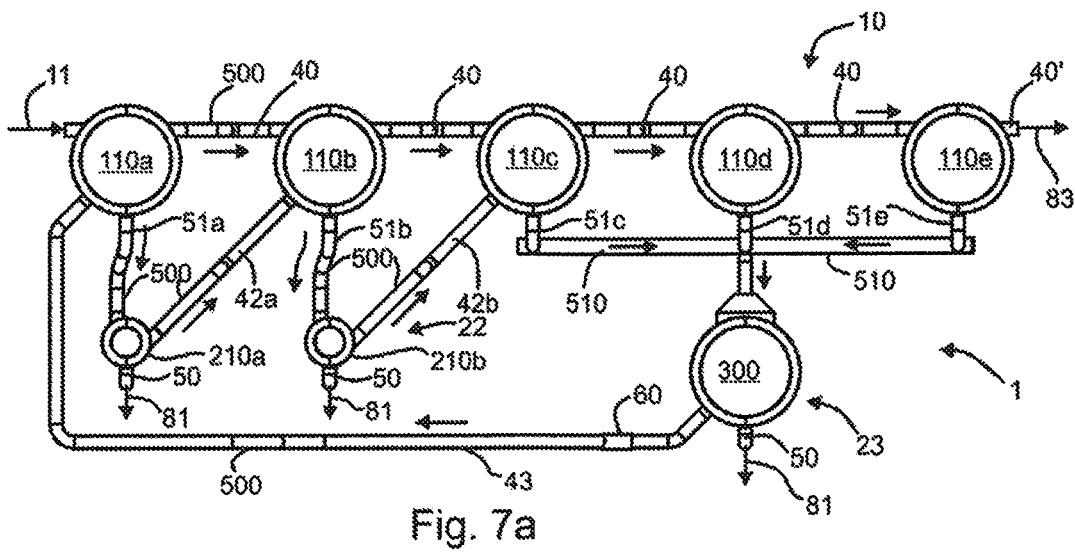
FIG. 7a is a flow chart illustration for an embodiment of the invention.
Figure 7B:
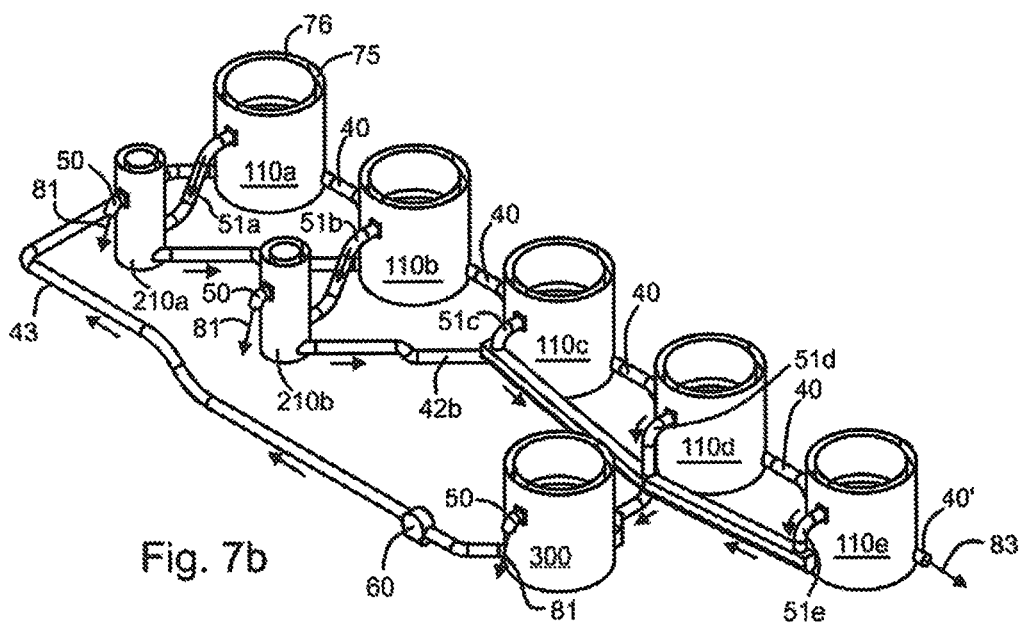
Figure 7C:
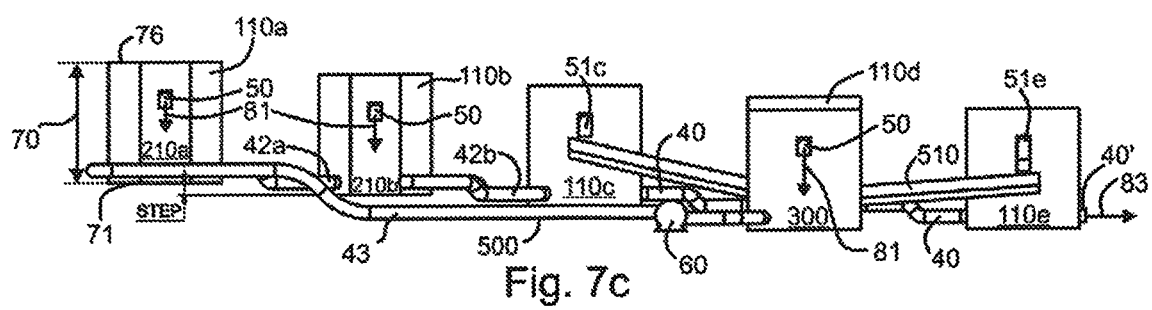

In an embodiment as depicted in FIGS. 7a-c, there are five primary flotation cells connected in series in the primary line 10, and the underflows 40 are treated similarly to what has been presented above in connection with Example 3. Also the first secondary flotation line is similar to that of Example 3, receiving the overflow 51a from the first primary flotation cell 110a. The underflow 42a is arranged to flow into the second primary flotation cell 110b, and the overflow 50 is collected as a first concentrate 81, as in Example 3.

However, a further secondary flotation line 22 with a secondary flotation cell 210b is arranged to receive the overflow 51b from the second primary flotation cell 110b. Overflow 50 of the secondary flotation cell 210b is collected as a first concentrate 81, and underflow 42b is arranged to flow into the third primary flotation cell 110c for further treatment.

The volume of the secondary flotation cells 210a, 210b may be smaller than volume of the primary flotation cells 110a, 110b, as has been described above.

Overflows 51c, 51d, 51e from the third, fourth and fifth primary flotation cells 110c, 110d, 110e are first collected into a collecting conduit 510 and directed together as one inflow into a further secondary flotation line 23 with an additional secondary flotation cell 300 to be separated into an overflow 50 and an underflow 43.

The volume of the additional secondary flotation cell 300 is chosen to accommodate the aggregate volume of overflows 51c, 51d, 51e. It may, however, be smaller in volume than the aggregate volume of the primary flotation cells 110c, 110d, 110e.

The underflow 43 is arranged to flow back upstream to the first primary flotation cell 110a to be once again treated in order to recover any mineral ore particles comprising valuable mineral still present in that flow. The flow of slurry may be driven by one or more low-head pumps, whereas the other flows may be driven by gravity if suitable steps are arranged between the adjoining flotation cells in fluid connection with each other (see FIG. 7b).

The overflow 50 is directed out of the additional secondary flotation cell 300 as a first concentrate 81, to be further treated in any suitable manner. The concentrates 81 from the first secondary flotation line 21, the second secondary flotation line 22, the further secondary flotation line 23 and the primary line 10 may be combined for further treatment.

Example 6

Figure 8A:
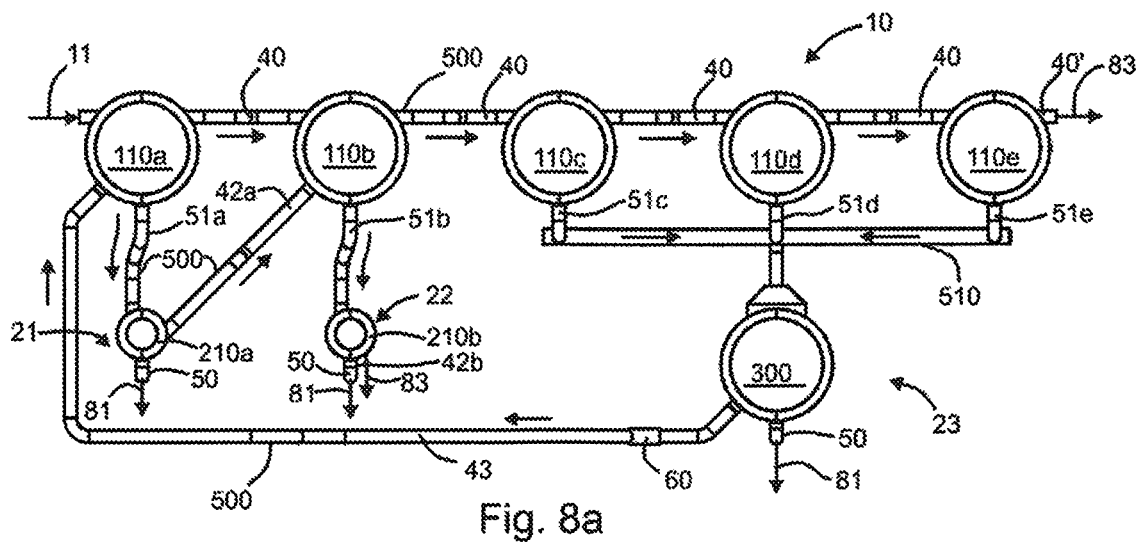
FIG. 8a is a flow chart illustration for an embodiment of the invention.
Figure 8B:
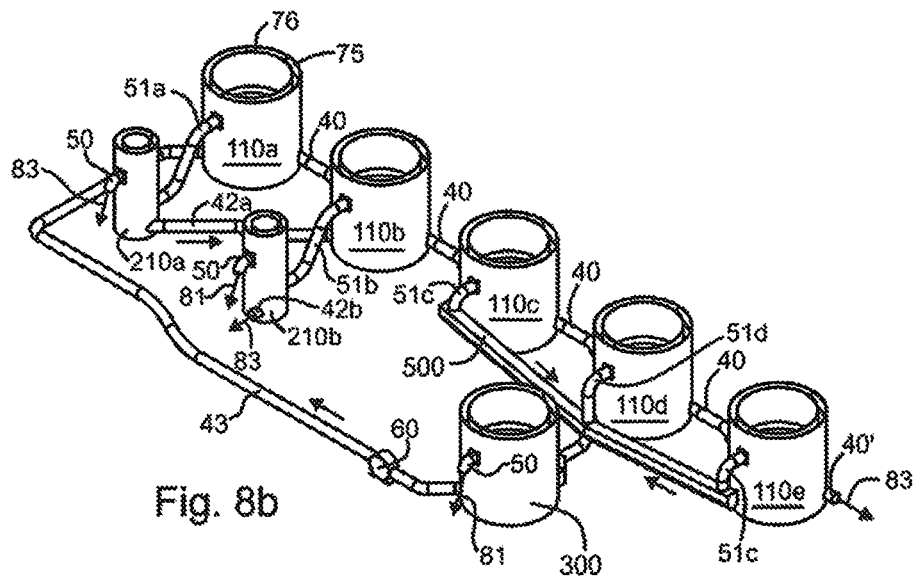
Figure 8C:
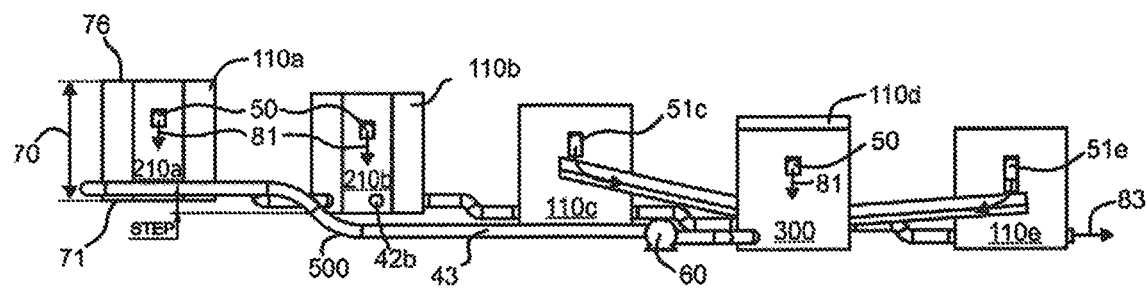

In FIGS. 8a-c, an otherwise similar embodiment to the one in Example 5 is presented. The underflow 42b from the second secondary flotation line 22 with a secondary flotation cell 210b is returned back into the primary flotation cell 110b from which the secondary flotation cell 210b received the overflow 51b, creating a short circulation of flotation between the second primary flotation cell 110a and the secondary flotation cell 210b.

Example 7

Figure 9C:
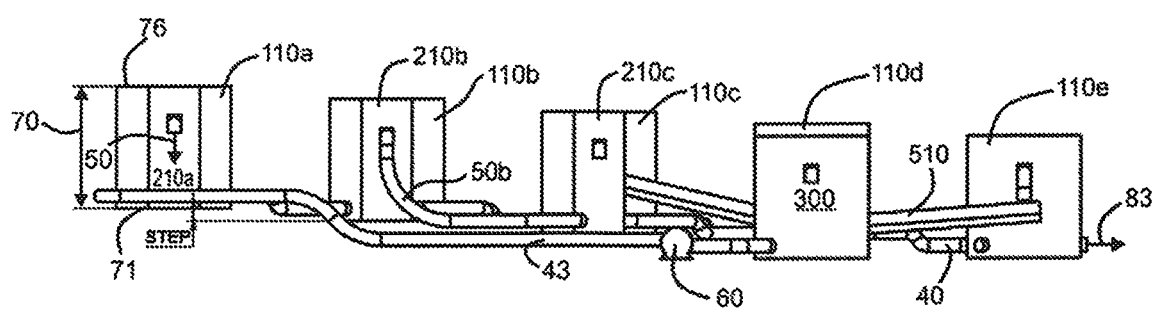

In FIGS. 9a-c, yet another embodiment otherwise similar to that of Example 5 is presented. The further secondary flotation line 22 comprises, instead of one secondary flotation cell 210b, two secondary flotation cells 210b, 210c arranged in series.

In this embodiment, the overflow from the second primary flotation cell 110b is directed into a further secondary flotation line 22 with a first secondary flotation cell 210b, from which the underflow 42b is directed downstream into the third primary flotation cell 110c similarly to what has been presented in Examples 5 and 6.

The overflow 50 from the first secondary flotation cell 210b of the further secondary flotation line 22 is directed into a second secondary flotation cell 210c to be further treated. In the overflow 50 of the second secondary flotation cell 210c, a first concentrate 81 is recovered, while the underflow 42c is directed into the fourth primary flotation cell 110d (the underflow 42c could, equally, be directed into the third primary flotation cell 110c) to be further treated.

Overflows 51c, 51d, 51e from the third, fourth and fifth primary flotation cells 110c, 110d, 110e are first collected into a collecting conduit 510 and directed together as one inflow into a further secondary flotation line 23 with an additional secondary flotation cell 300 to be separated into an overflow 50 and an underflow 43, as in Example 5.

Example 8

In one embodiment of the invention (FIGS. 10a-c), the primary flotation line 10 comprises also five primary flotation cells 110a, 110b, 110c, 110d, 110e. The two first primary flotation cells 110a, 110b have a larger volume than the last three flotation cells 110c, 110d, 110e. The flotation process in the primary flotation line 10 is, however, similar to what has been described in connection with Examples 3-7.

The two secondary flotation lines 21, 22 function similarly to those described in connection with Example 5. The volume of the flotation cells 210a, 210b is smaller than the volume of the first flotation cells 110a, 110b.

Figure 10A:
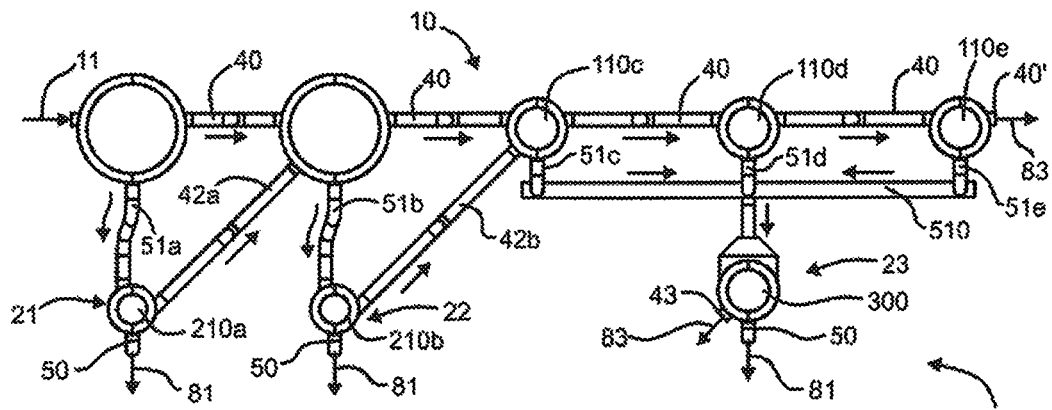
FIG. 10a is a flow chart illustration for an embodiment of the invention.
Figure 10B:
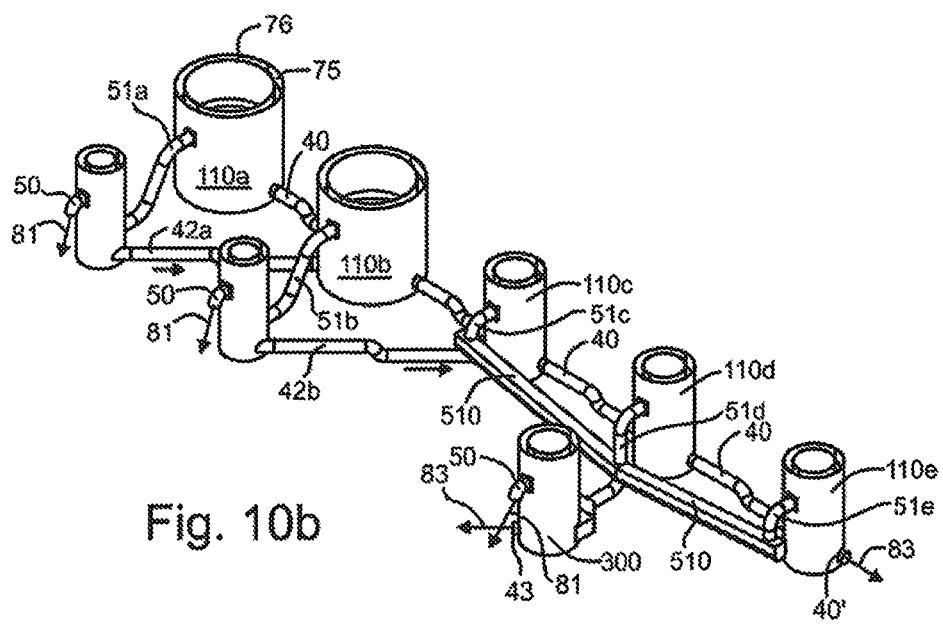
Figure 10C:
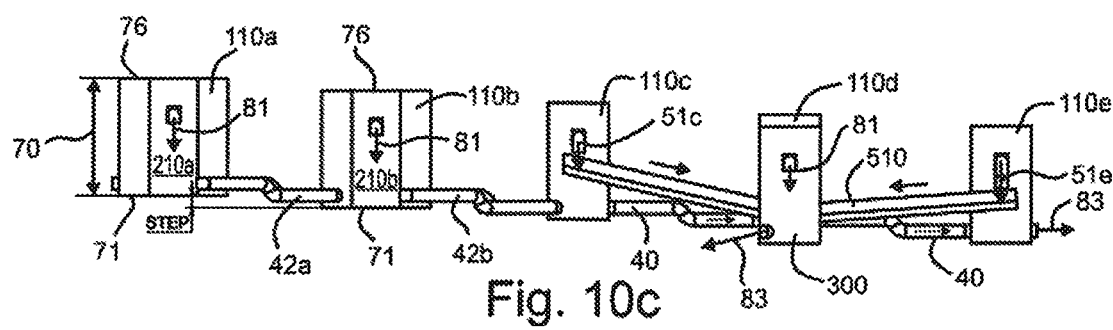

The flotation arrangement 1 further comprises a third secondary flotation line 23 with an additional secondary flotation cell 300, arranged to receive the combined overflows 51c, 51d, 51e from the three last primary flotation cells 110c, 110d, 110e via a collecting conduit 510. As the aggregate volume of the three last primary flotation cells 110b, 110c, 110d is smaller in this embodiment, also the volume of the additional secondary flotation cell 300 may be smaller, as can be seen in FIGS. 10a and 10b.

The underflow 43 from the additional secondary flotation cell 300 is led out of the flotation arrangement 1 as tailings flow 83, which may be combined with the tailings flow 83 of the primary flotation line 10. The combined tailings flow may, for example, be led into another flotation arrangement 1 for the recovery of a second concentrate 82.

Overflow 50 of the additional secondary flotation cell 300 comprises a recovered first concentrate 81, to be further processed similarly to what has been described in connection with the other examples and embodiments.

Example 9

Figure 11B:
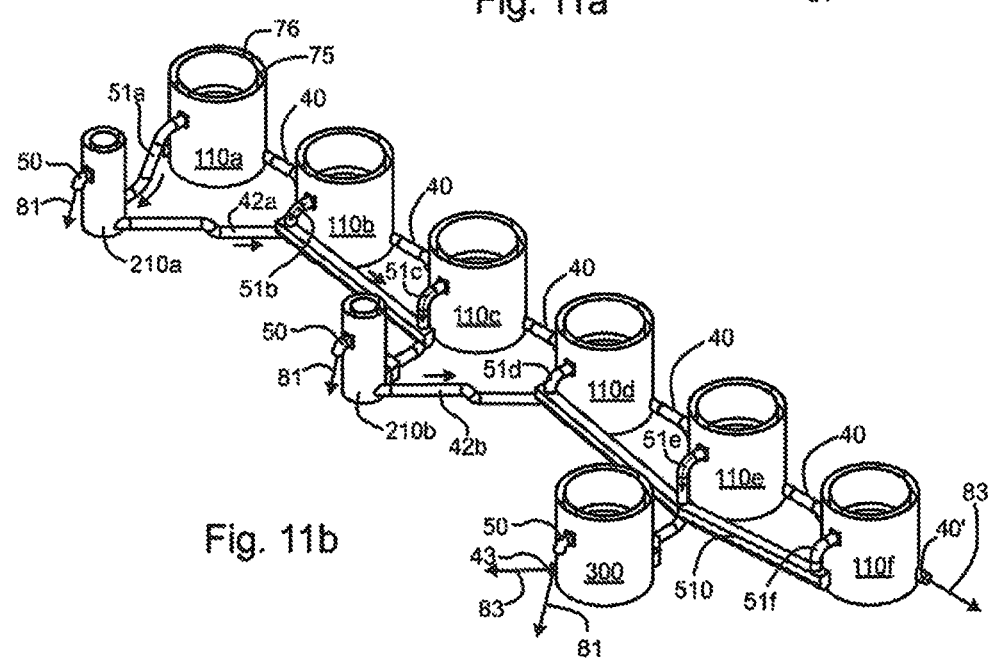
Figure 11C:
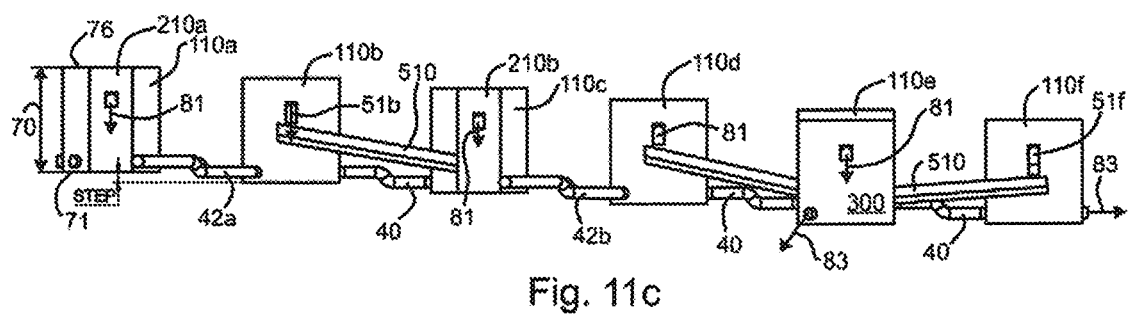

In FIGS. 11a-c, yet another embodiment of the flotation arrangement 1 is presented. In this embodiment, the primary line 10 comprises six primary flotation cells 110a, 110b, 110c, 110d, 110e, 110f. The flotation process in the primary flotation line 10 is similar to what has been described in connection with Examples 3-8.

Overflow 51*a* from the first primary flotation cell 110*a* is directed into a first secondary flotation line 21 with a secondary flotation cell 210*a* via a conduit 500 to be separated into an overflow 50 and an underflow 42*a* in the secondary flotation cell 210*a*. The secondary flotation cell 210*a* may be smaller in volume than the first primary flotation cell 210*a*. The overflow 50 is directed out of the first secondary flotation line 21 as a first concentrate 81, to be further treated in any suitable manner.

The underflow 42*a*, which may comprise an amount of mineral ore particles comprising valuable mineral, from the first secondary flotation cell 210*a* is directed into the second primary flotation cell 110*b* for further treatment in order to recover any remaining mineral ore particles comprising valuable mineral, thus increasing the recovery rate for that mineral within the flotation arrangement 1.

Overflows 51*b*, 51*c* from the second and third primary flotation cells 110*b*, 110*c* are first collected into a collecting conduit 510 and directed together as one inflow into a further secondary flotation line 22 with a secondary flotation cell 210*b* to be separated into an overflow 50 and an underflow 42*b*. The volume of the secondary flotation cell 210*b* of the further secondary flotation line 22 may be smaller than the aggregate volume of the two primary flotation cells 110*b*, 110*c* from which it received the overflows 51*b*, 51*c*.

Overflow 50 of the secondary flotation cell 210*b* is collected as a first concentrate 81, and underflow 42*b* is arranged to flow into the fourth primary flotation cell 110*d* for further treatment.

The flotation arrangement 1 further comprises a third secondary flotation line 23 with an additional secondary flotation cell 300, arranged to receive the combined overflows 51*d*, 51*e*, 51*f* from the three last primary flotation cells 110*d*, 110*e*, 110*f* via a collecting conduit 510.

The underflow 43 from the additional secondary flotation cell 300 is led out of the flotation arrangement 1 as a tailings flow 83, which may be combined with the tailings flow 83 of the primary flotation line 10. The combined tailings flow may, for example, be led into another flotation arrangement 1 for the recovery of a second concentrate 82.

Overflow 50 of the additional secondary flotation cell 300 comprises a recovered first concentrate 81, to be further processed similarly to what has been described in connection with the other examples and embodiments.

Example 10

Figure 12:
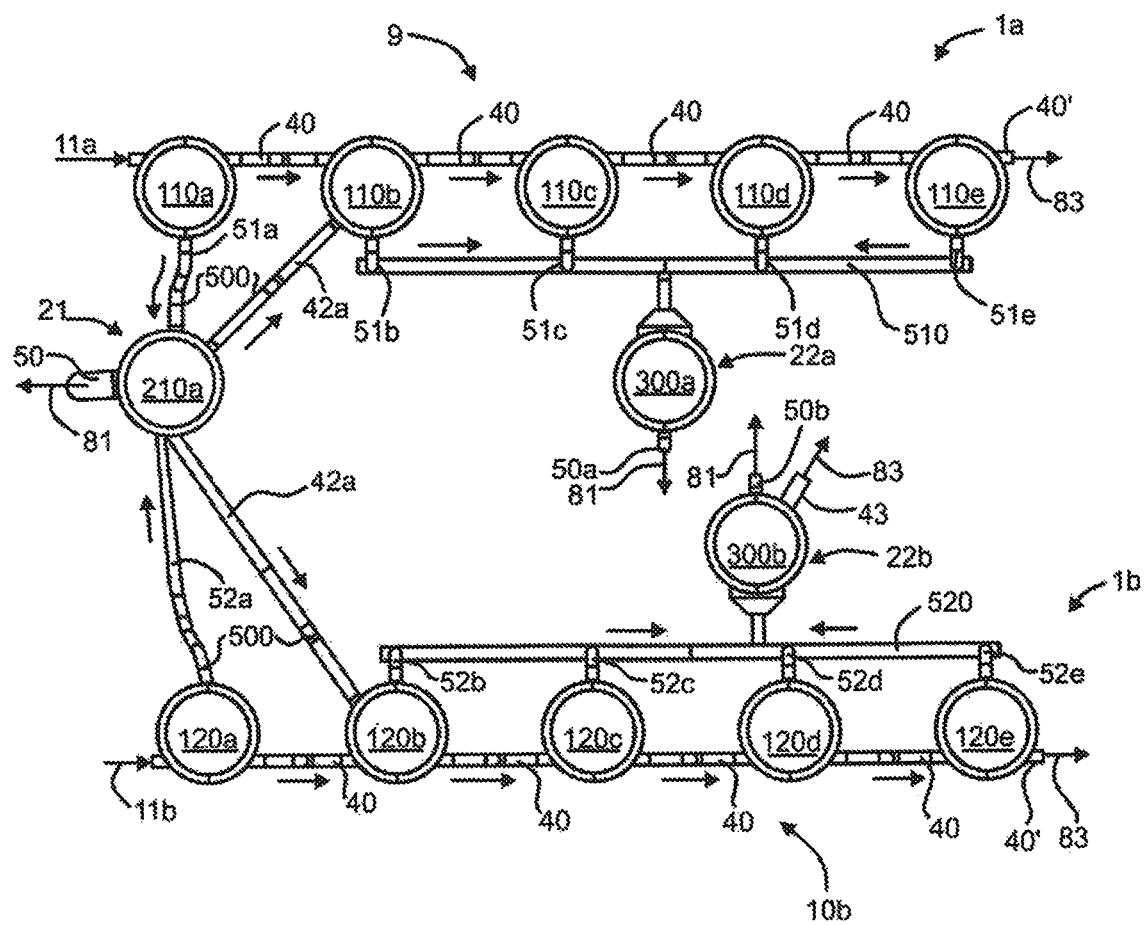
FIG. 12 is a flow chart illustration for an embodiment of the invention.

In FIG. 12, a further embodiment of the flotation arrangement 1 is presented. In the embodiment, there are two primary flotation lines 10, a first primary flotation line 10*a* and a second primary flotation line 10*b*, both comprising five primary flotation cells 110*a-e*, 120*a-e*. The primary flotation lines 10*a*, 10*b* are arranged to treat the flow of slurry similarly as described in connection with, for example, Examples 3 and 4.

However, the primary overflows 51*a*, 52*a* from the first primary flotation cells 110*a*, 120*a* of both of the primary flotation lines 10*a*, 10*b* are arranged to flow into a single secondary flotation line 21 comprising a secondary flotation cell 210*a*. The overflow 50 from the secondary flotation cell 210*a* is recovered as a first concentrate 81. The underflow 42*a* is directed downstream into both a second primary flotation cell 110*b* of the first primary flotation line 10*a* and a second primary flotation cell 120*b* of the second primary flotation line 10*b* to be further treated in the respective flotation lines.

The flotation arrangement 1 further comprises a first further secondary flotation line 22*a* with an additional secondary flotation cell 300*a*, arranged to receive the combined overflows 51*b*, 51*c*, 51*d*, 51*e* from the three last primary flotation cells 110*b*, 110*c*, 110*d*, 110*e* of the first primary flotation line 10*a* via a collecting conduit 510; and a second further secondary flotation line 22*b* with an additional secondary flotation cell 300*b*, arranged to receive the combined overflows 52*b*, 52*c*, 52*d*, 52*e* from the three last primary flotation cells 120*b*, 120*c*, 120*d*, 120*e* of the second primary flotation line 10*b* via a collecting conduit 520.

Similarly to what has been described in connection with Example 9, the underflows 43*a*, 43*b* from the additional secondary flotation cells 300*a*, 300*b* are led out of the flotation arrangement 1 as tailings flow 83, which may be combined with the tailings flow 83 of the primary flotation lines 10*a*, 10*b*. Overflows 50*a*, 50*b* of the additional secondary flotation cells 300*a*, 300*b* comprises a recovered first concentrate 81, to be further processed similarly to what has been described in connection with the other examples and embodiments.

Example 11

In FIG. 13*a*, a further embodiment of the flotation arrangement 1 is presented. In essence, it comprises the same constructional details as the arrangement of Example 9 (see FIG. 11*a*), but instead of single flotation cells 110, 210, where the slurry is both aerated and separated into two fractions (overflow and underflow) in a single cell, each flotation line 10, 21, 22, 23 comprises a first preparatory flotation cell 111, 211 and a flotation cell 110, 210 adjoining the preparation flotation cell via a hydraulic conduit 41. In the preparation flotation cell the flow of slurry is aerated either by an agitator equipped with gas input or a sparger-type aeration device. The adjoining flotation cell operates as a flotation cell without mechanical agitation to ensure the stability of the gas bubble-ore particle agglomerates and the formation of a undisturbed froth layer.

Slurry inflow 11 is first led into a primary flotation line 10 of the flotation arrangement 1. More specifically, the slurry is led into a preparation flotation cell 111*a* to be treated as disclosed above. From the preparation flotation cell 111*a*, the flow of slurry is directed via a hydraulic conduit 41 to a flotation cell 110*a*, from which the overflow 51*a* is directed to a first secondary flotation line 21 comprising a similar preparation flotation cell 211*a* and a via a hydraulic conduit 41 adjoining flotation cell 210*a*.

The underflow 40 from primary flotation cell 210*a* of the primary flotation line 10 is led further downstream to be treated similarly in the further preparation flotation cells and flotation cells of the primary line 10 until the underflow 40' of the last flotation cell 110*f* is led out of the flotation arrangement 1 as tailings flow 83.

The underflow 42*a* from the flotation cell 210*a* of the first secondary flotation line 21 is directed into a second preparation flotation cell 111*b* downstream from the primary flotation unit from which the overflow 51*a* into the preparatory flotation cell 211*a* of the first secondary flotation line 21 was received from, back to be further treated in the primary line 10.

The overflow 50 from the first secondary flotation cell 210*a* is directed out of the first secondary flotation line 21 as a first concentrate 81.

Similarly to Example 9, a further secondary flotation line 22 is arranged to receive the combined overflow 51*b*, 51*c* from the second and third primary flotation cells 110*b*, 110*c*, which both are also preceded by a preparatory flotation cell 111b, 111c. The combined overflows 51a, 51b are then directed into a further secondary preparation flotation cell 210b via a collecting conduit 510. Underflow 42b from further the secondary flotation cell 210b is directed back into the primary flotation line 10 downstream from the flotation cell 110b, 10c from which the overflows 51b, 51c were received into the further secondary flotation line 22.

The flotation arrangement 1 further comprises an additional secondary floatation line 23 comprising a preparation flotation cell 301 and a flotation cell 300. The combined overflows 51d, 51e, 51f from further primary flotation cells 111d, 111e, 111f are directed into the preparation flotation cell 301 of the additional secondary flotation line 23 via a collecting conduit 510. The overflow 50 from the additional secondary flotation line 23, collected as the overflow from the flotation cell 300, comprises the recovered first concentration 81. Underflow 43 from the additional secondary flotation line 23 may be directed out of the flotation arrangement 1 as tailings flow 83.

Example 12

In FIG. 13b, yet another embodiment of the flotation arrangement 1 is presented. In essence, it is to an extent similar to the arrangement of Example 10 (see FIG. 12), i.e. there are two primary lines 10a, 10b. However, instead of single secondary flotation cells 210, where the slurry is both aerated and separated into two fractions (overflow and underflow) in a single cell, the secondary flotation lines 21, 22, 23 comprise a preparation flotation cell 211 and a flotation cell 210 adjoining the preparation flotation cell 211 via a hydraulic conduit 41. The primary two lines 10a, 10b are exactly the same as the primary line 10 of Example 9, presented above.

The primary overflows 51a, 52a from the first primary flotation cells 110a, 120a of both of the primary flotation lines 10a, 10b are arranged to flow into a single secondary flotation line 21 comprising a preparatory flotation cell 211a and a flotation cell 210a. More specifically, the primary overflows 51a, 52a are arranged to flow into the preparation flotation cell 211a of the first secondary line 21. The overflow 50 from the secondary flotation cell 210a is recovered as a first concentrate 81.

The underflow 42a from the flotation cell 210a of the first secondary flotation line 21 is directed into a second preparation flotation cell 111b downstream from the primary flotation unit from which the overflow 51a into the preparation flotation cell 211a of the first secondary flotation line 21 was received from, back to be further treated in the primary line 10.

The overflow 50 from the flotation cell 210a of the first secondary flotation line 21 is directed out of the first secondary flotation line 21 as a first concentrate 81.

Similarly to Example 9, a further secondary flotation line 22 is arranged to receive the combined overflow 51b, 51c from the second and third primary flotation cells 110b, 110c or the first primary line 10a via a collecting conduit 510, as well as the overflows 52b, 52c from the second and third primary flotation cells 120b, 120c of the second primary line 10b via a collecting conduit 520. More specifically, there is a preparatory flotation cell 211b of the further secondary flotation line that receives the combined overflows 51b, 51c, 52a, 52b.

The underflow 42b from the flotation cell 210b of the further secondary flotation line 22 is directed is directed back into the first primary flotation line 10a downstream from the primary flotation cell 110b, 110c from which the overflows 51b, 51c were received into the further secondary flotation line 22. The overflow 50 from the flotation cell 210b of the further secondary flotation line 22 is directed out of the further secondary flotation line 22 as a first concentrate 81.

The flotation arrangement 1 further comprises an additional secondary flotation line 23 comprising a preparation flotation cell 301 and a flotation cell 300. The combined overflows 51d, 51e, 51f from last three primary flotation cells 110d, 110e, 110f of the first primary flotation line 10a, as well as the overflow 52e from the second last primary flotation cells 120e of the second primary flotation line 10b, are directed into the preparatory flotation cell 301 of the additional secondary flotation line 23 via a collecting conduit 510, 520. The overflow 50 from the additional secondary flotation line 23, collected as the overflow from the flotation cell 300, comprises the recovered first concentration 81. Underflow 43 from the additional secondary flotation line 23 may be directed out of the flotation arrangement 1 as tailings flow 83.

Example 13

In FIGS. 14a and 14b, an embodiment of a flotation plant is presented.

The flotation plant comprises two flotation arrangements 1a, 1b, which are of the type described in Example 5. A first flotation arrangement 1a is intended for the recovery of a first concentrate 81, and a second flotation arrangement 1b is intended for the recovery of a second concentrate 82.

The primary flotation cells 110a-e of the first flotation arrangement 1a and the primary flotation cells 120a-e of the second flotation arrangement 1b are arranged in series.

As the functions and arrangement of flows of the flotation arrangements 1a, 1b have already been discussed in detail in connection with Example 5, the details of the flotation arrangements 1a, 1b are not discussed herein again.

The tailings flow 83 collected from the underflow 40' of the last primary flotation cell 110e of the primary line 10 of the first flotation arrangement 1a is directed into an arrangement suitable for further treating the mineral ore particles suspended in the slurry. In an embodiment, the arrangement may be a grinding step 64 or, in another embodiment, an arrangement 65 for the addition of flotation chemicals. (In FIGS. 14a-b, the arrangement only shown in an exemplary manner, and it is to be understood that the box may represent either a grinding step 64 or an arrangement 65 for the addition of flotation chemicals, depending on the embodiment.)

In an embodiment where the arrangement comprises a grinding step 64, the second concentrate 82 recovered in the second flotation arrangement 1b contains ore particles comprising the same valuable mineral as the first concentrate 81 recovered in the first flotation arrangement 1a (i.e. the two concentrates have a same or similar mineralogy), but the particle size distribution of the second concentrate 82 is different due to the grinding circuit 62.

Alternatively, the further processing step may comprise reconditioning the slurry flow collected as tailings flow 83 of the first flotation arrangement 1a, i.e. treating the slurry with further flotation chemicals in order to prepare the slurry inflow 11b for the recovery of a second concentration 82. In that case, the second concentrate 82 recovered in the second flotation arrangement 1b contains ore particles comprising to different valuable mineral as the first concentrate 81 recovered in the first flotation arrangement 1a. The two concentrates have thus different minerology.

The embodiments described hereinbefore may be used in any combination with each other. Several of the embodiments may be combined together to form a further embodiment. An arrangement, a method, a plant or a use, to which the disclosure is related, may comprise at least one of the embodiments described hereinbefore. It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A flotation arrangement for treating mineral ore particles suspended in slurry, comprising flotation cells for the separation of the slurry into an underflow and an overflow, wherein the separation is performed with the help of flotation gas, and wherein the flotation arrangement comprises:
   a primary line comprising at least two primary flotation cells connected in series, wherein each subsequent primary flotation cell of the primary line is arranged to receive underflow from a previous primary flotation cell of the primary line, the at least two primary flotation cells comprising at least one primary flotation cell and a further primary flotation cell downstream of the at least one primary flotation cell;
   a first secondary line comprising a secondary flotation cell in fluid communication with the at least one primary flotation cell and arranged to receive primary overflow of the at least one primary flotation cell for the recovery of a first concentrate,
   a further secondary line downstream of the first secondary line, the further secondary line comprising a secondary flotation cell in fluid communication with the further primary flotation cell and arranged to receive primary overflow of the further primary flotation cell for the recovery of the first concentrate,
   wherein underflow from the first secondary line is arranged to flow to a last of the at least one primary flotation cell from which the primary overflow was received, or to a primary flotation cell downstream of the last of the at least one primary flotation cell from which the primary overflow was received.

2. The flotation arrangement according to claim 1, wherein the secondary flotation cell of the first secondary flotation line is arranged in direct fluid communication with the at least one primary flotation cell and/or the secondary flotation cell of the further secondary flotation line is arranged in direct fluid communication with the further primary flotation cell.

3. The flotation arrangement according to claim 1, wherein the underflow from the first secondary line is arranged to flow to a primary flotation cell after which there are at least two more primary flotation cells in the primary flotation line.

4. The flotation arrangement according to claim 1, wherein the primary line comprises at least three primary flotation cells.

5. The flotation arrangement according to claim 1, wherein the first secondary line comprises 1-4 secondary flotation cells.

6. The flotation arrangement according to claim 1, wherein the further secondary line comprises 1-3 secondary flotation cells.

7. The flotation arrangement according to claim 1, wherein the number of secondary flotation cells in series in the further secondary line is the same or higher than the number of secondary flotation cells in series in the first secondary line.

8. The flotation arrangement according to claim 1, wherein the further secondary line is arranged to receive primary overflow from 1-3 primary flotation cells.

9. The flotation arrangement according to claim 1, wherein a first secondary cell of the first secondary line has a larger volume than a first secondary cell of the further secondary line.

10. The flotation arrangement according to claim 1, wherein a first primary flotation cell of the primary line is at least 100 m3 in volume.

11. The flotation arrangement according to claim 1, wherein a second primary flotation cell of the primary line is at least 100 m3 in volume.

12. The flotation arrangement according to claim 1, wherein a volume of a second primary flotation cell of the primary line is equal or less than a volume of the first primary flotation cell.

13. The flotation arrangement according to claim 1, wherein the secondary flotation cell of the first secondary line in fluid communication with a primary flotation cell is 100-1000 m3 in volume.

14. The flotation arrangement according to claim 1, wherein the secondary flotation cell of the further secondary line in fluid communication with a primary flotation cell is 100-1000 m3 in volume.

15. The flotation arrangement according to claim 1, wherein a volume of the secondary flotation cell of the first secondary line in fluid communication with at least one primary flotation cell is 2-50% of the aggregate volume of the at least one primary flotation cell.

16. The flotation arrangement according to claim 1, wherein a volume of the secondary flotation cell of the further secondary line in fluid communication with at least one primary flotation cell is 3-30% of the aggregate volume of the at least one primary flotation cell.

17. The flotation arrangement according to claim 1, wherein the flow of the slurry is driven by gravity, or by one or more low-head pumps, or by gravity and by one or more low-head pumps.

18. The flotation arrangement according to claim 1, wherein the flow of the slurry to and/or away from any secondary flotation cell is driven by gravity, by one or more low-head pumps, or by gravity and by one or more low-head pumps.

19. The flotation arrangement according to claim 18, wherein the flow of the slurry to and/or away from any two secondary flotation cells is driven by gravity, by one or more low-head pumps, or by gravity and by one or more low-head pumps.

20. The flotation arrangement according to claim 1, wherein primary overflow from any primary flotation cell is driven by gravity, or wherein the primary overflow from the at least two primary flotation cells is driven by gravity.

21. The flotation arrangement according to claim 1, wherein overflow from any secondary flotation cell is driven by gravity, or wherein overflow from any at least two secondary flotation cells is driven by gravity.

22. The flotation arrangement according to claim 1, wherein overflow from each secondary flotation cell is driven by gravity.

23. The flotation arrangement according to claim 1, wherein underflow from a primary flotation cell is driven by gravity, or wherein the underflow from at least two primary flotation cells is driven by gravity.

24. The flotation arrangement according to claim 1, wherein underflow from any secondary flotation cell is driven by gravity, or wherein underflow from any at least two secondary flotation cells is driven by gravity.

25. The flotation arrangement according to claim 1, wherein underflow from each primary flotation cell is driven by gravity.

26. The flotation arrangement according to claim 1, wherein underflow from each secondary flotation cell is driven by gravity.

27. The flotation arrangement according to claim 1, wherein primary overflow from a primary flotation cell is driven by a low-head pump, or wherein the primary overflow from at least two primary flotation cells is driven by a low-head pump.

28. The flotation arrangement according to claim 1, wherein overflow from any secondary flotation cell is driven by a low-head pump, or wherein overflow from any at least two secondary flotation cells is driven by a low-head pump.

29. The flotation arrangement according to claim 1, wherein overflow from each secondary flotation cell is driven by a low-head pump.

30. The flotation arrangement according to claim 1, wherein underflow from a primary flotation cell is driven by a low-head pump, or wherein the underflow from at least two primary flotation cells is driven by a low-head pump.

31. The flotation arrangement according to claim 1, wherein underflow from any secondary flotation cell is driven by a low-head pump, or wherein underflow from any at least two secondary flotation cells is driven by a low-head pump.

32. The flotation arrangement according to claim 1, wherein underflow from each primary flotation cell is driven by a low-head pump.

33. The flotation arrangement according to claim 1, wherein underflow from each secondary flotation cell is driven by a low-head pump.

34. The flotation arrangement according to claim 1, wherein underflow between two primary flotation cells is driven by gravity, overflow from the two primary flotation cells is arranged to flow to different secondary lines, and the slurry surface level in said primary flotation cells is different.

35. The flotation arrangement according to claim 1, wherein overflow from any primary flotation cell, to which underflow from any secondary flotation cell is directed to flow, is arranged to flow into a further processing step.

36. The flotation arrangement according to claim 35, wherein combined overflow of the any primary flotation cell to which underflow from any secondary flotation cell is directed to flow and of any primary flotation cell downstream of the any primary flotation cell to which underflow from any further secondary flotation cell is directed to flow, is arranged to flow into the further processing step.

37. The flotation arrangement according to claim 35, wherein the flotation arrangement performs the further processing step, the further processing step comprising a grinding step.

38. The flotation arrangement according to claim 35, wherein the further processing step comprises an additional secondary flotation cell in fluid communication with the any primary flotation cell and arranged to receive primary overflow from the any primary flotation cell, and wherein underflow from the additional secondary flotation cell is arranged:
to flow to any other primary flotation cell upstream of the any primary flotation cell from which the primary overflow was received, or
to leave the flotation arrangement.

39. The flotation arrangement according to claim 38, wherein the additional secondary flotation cell is arranged to receive primary overflow from any at least two primary flotation cells, or from any at least three primary flotation cells.

40. The flotation arrangement according to claim 38, wherein the additional secondary flotation cell is arranged in a position downstream from the first secondary line and the further secondary line.

41. The flotation arrangement according to claim 1, wherein the underflow from a second secondary flotation cell of any secondary line is arranged to flow to any primary flotation cell downstream from the primary flotation cell from which the primary overflow was received by the any secondary line.

42. The flotation arrangement according to claim 41, wherein there is one primary flotation cell arranged between a last primary flotation cell from which primary overflow was received by the any secondary line and the primary flotation cell to which the underflow from the second secondary flotation cell is arranged to flow.

43. The flotation arrangement according to claim 1, wherein underflow from a first secondary flotation cell of the further secondary line is arranged to flow to any primary flotation cell downstream of the further primary flotation cell.

44. The flotation arrangement according to claim 1, wherein underflow from each secondary flotation cell in direct fluid communication with any primary flotation cell is arranged to flow to any downstream primary flotation cell.

45. The flotation arrangement according to claim 1, wherein primary overflow from a primary flotation cell is arranged to flow into two parallel secondary flotation cells.

46. The flotation arrangement according to claim 1, wherein the flotation arrangement comprises another primary line comprising another at least two primary flotation cells connected in series, and the first secondary line is arranged to receive overflow from a first primary cell of the primary line and a first primary cell of the other primary line.

47. The flotation arrangement according to claim 46, wherein the further secondary line is arranged to receive overflow from a second primary flotation cell of the primary line and a second primary flotation cell of the other primary line.

48. The flotation arrangement according to claim 1, wherein one or more of the primary flotation cells and/or one or more of the secondary flotation cells comprise froth flotation cells.

49. The flotation arrangement according to claim 48, wherein flotation gas is fed into any flotation cell where the slurry is separated into the overflow and the underflow.

50. The flotation arrangement according to claim 48, wherein flotation gas is fed into a preparation flotation cell into which a mixer is arranged.

51. The flotation arrangement according to claim 1, wherein the mineral ore particles comprise Cu, or Zn, or Fe, or pyrite, or metal sulfide.

52. A method of employing a flotation arrangement according to claim 1, comprising the step of recovering mineral ore particles comprising a valuable mineral.

53. A method of employing a flotation arrangement according to claim 52, wherein the valuable mineral is recovered from low grade ore.

54. A method of employing a flotation arrangement according to claim 52, wherein the recovered mineral ore particles comprises Cu from low grade ore.

55. A flotation plant comprising a flotation arrangement according to claim 1.

56. The flotation plant according to claim 55, wherein the plant comprises at least two flotation arrangements.

57. The flotation plant according to claim 55, wherein the plant comprises at least one flotation arrangement for the recovery of a first concentrate and at least one flotation arrangement for the recovery of a second concentrate.

58. The flotation plant according to claim 57, wherein the primary flotation cells of the primary line of the at least one flotation arrangement for the recovery of the first concentrate and the primary flotation cells of the primary line of the at least one flotation arrangement for the recovery of the second concentrate are arranged in series.

59. The flotation plant according to claim 57, wherein the plant further comprises an arrangement for further treating mineral ore particles suspended in slurry so that the second concentrate is different from the first concentrate.

60. The flotation plant according to claim 59, wherein the arrangement for further treating mineral ore particles suspended in slurry comprises a grinding step disposed between the at least one flotation arrangement for the recovery of the first concentrate and the at least one flotation arrangement for the recovery of the second concentrate.

61. The flotation plant according to claim 59, wherein the plant for further treating mineral ore particles suspended in slurry comprises an arrangement for the addition of flotation chemicals disposed between the at least one flotation arrangement for the recovery of the first concentrate and the at least one flotation arrangement for the recovery of the second concentrate.

62. The flotation plant according to claim 55, wherein the primary line comprises 10 primary flotation cells, and wherein the overflow from the last of the primary flotation cells is arranged to flow into any secondary flotation line comprising an additional secondary flotation cell, and wherein the underflow from the additional secondary flotation cell is arranged to flow back into the 1-4 first primary floatation cells of the primary line.

63. The flotation plant according to claim 55, wherein the flotation arrangement is arranged to recover mineral ore particles comprising Cu, and/or Zn, and/or pyrite, and/or a metal from a sulfide.

64. The flotation plant according to claim 55, wherein the flotation arrangement is arranged to recover mineral ore particles comprising Cu from low grade ore.

65. The flotation plant according to claim 55, wherein the flotation arrangement is arranged to recover Fe by reverse flotation.

66. A flotation method for treating mineral ore particles suspended in slurry, comprising:
    subjecting the slurry to at least two stages of primary flotation in series for separating the slurry into a primary underflow and a primary overflow, wherein primary underflow from a stage of primary flotation is directed to a subsequent further stage of primary flotation,
    directing, after at least one stage of primary flotation, at least one primary overflow to at least one stage of first secondary flotation for the recovery of a first concentrate, and
    directing, after a further stage of primary flotation, a further primary overflow to at least one stage of further secondary flotation for the recovery of the first concentrate,
    wherein underflow from the at least one stage of first secondary flotation is directed to primary flotation in a last of the at least one stage of primary flotation from which the primary overflow was received, or to a stage of primary flotation downstream therefrom.

67. The flotation method according to claim 66, wherein the slurry is subjected to at least three stages of primary flotation.

68. The flotation method according to claim 66, wherein the at least one primary overflow is directed to 1-4 stages of first secondary flotation.

69. The flotation method according to claim 66, wherein the at least one further primary overflow is directed to 1-4 stages of further secondary flotation.

70. The flotation method according to claim 66, wherein the flow of slurry is directed from any one stage of flotation to a following stage of flotation by gravity, or by one or more low-head pumps, or by gravity and one or more low-head pumps.

71. The flotation method according to 145, wherein at least one primary overflow is directed to at least one stage of further processing.

72. The flotation method according to claim 71, wherein the stage of further processing comprises a grinding stage.

73. The flotation method according to claim 71, wherein the at least one stage of further processing comprises a stage of additional secondary flotation, and wherein the underflow from the stage of additional secondary flotation is directed:
    to any stage of primary flotation upstream of the at least one stage of primary flotation from which stage the primary overflow was received, or
    out of the flotation stages.

74. The flotation method for flotation according to claim 73, wherein primary overflow from at least two stages of primary flotation is directed to the stage of additional secondary flotation, or wherein primary overflow from at least three stages of primary flotation is directed to the stage of additional secondary flotation.

75. The flotation method according to claim 66, wherein the underflow from a second stage of any secondary flotation is directed to a stage of primary flotation downstream from the stage of primary flotation from which the overflow to the second stage of secondary flotation was received.

76. The flotation method according to claim 66, wherein the underflow from a first stage of any secondary flotation is directed to a stage of primary flotation downstream of a last stage of primary flotation from which the primary overflow to the first stage of secondary flotation was received.

77. The flotation method according to claim 66, wherein the underflow from a second stage of any secondary flotation is directed to a stage of primary flotation downstream of a last stage of primary flotation from which the primary overflow to the second stage of secondary flotation was received.

78. The flotation method according to claim 66, wherein primary overflow from a stage of primary flotation is directed to two parallel stages of secondary flotation.

79. The flotation method according to claim 66, wherein froth flotation is employed.

80. The flotation arrangement according to claim 51, wherein the mineral ore particle comprises gold sulfide.

* * * * *